United States Patent
Kurtz et al.

(10) Patent No.: US 11,868,804 B1
(45) Date of Patent: Jan. 9, 2024

(54) PROCESSOR INSTRUCTION DISPATCH CONFIGURATION

(71) Applicant: Groq, Inc., Mountain View, CA (US)

(72) Inventors: Brian Lee Kurtz, Southlake, TX (US); Dinesh Maheshwari, Fremont, CA (US); James David Sprach, Monte Sereno, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

(21) Appl. No.: 16/951,938

(22) Filed: Nov. 18, 2020

Related U.S. Application Data

(60) Provisional application No. 62/937,123, filed on Nov. 18, 2019.

(51) Int. Cl.
  *G06F 9/30*  (2018.01)
  *G06F 9/48*  (2006.01)
  (Continued)

(52) U.S. Cl.
  CPC .............. *G06F 9/4881* (2013.01); *G06F 5/01* (2013.01); *G06F 9/3802* (2013.01); *G06F 9/3856* (2023.08); *G06F 9/3885* (2013.01)

(58) Field of Classification Search
  CPC .... G06F 9/4881; G06F 9/3802; G06F 9/3855; G06F 9/3885; G06N 3/063
  See application file for complete search history.

(56) References Cited

U.S. PATENT DOCUMENTS

| | | | |
|---|---|---|---|
| 4,670,856 A | 6/1987 | Nishino et al. | |
| 5,058,001 A | 10/1991 | Li | |

(Continued)

FOREIGN PATENT DOCUMENTS

| | | |
|---|---|---|
| EP | 0 940 012 B1 | 4/2002 |
| EP | 3 343 463 A1 | 7/2018 |

(Continued)

OTHER PUBLICATIONS

Temam et al.; On-Chip Instruction Generation for Cross-Layer CNN Accelerator on FPGA; Jul. 2019; IEEE (Year: 2019).*

(Continued)

*Primary Examiner* — Corey S Faherty
(74) *Attorney, Agent, or Firm* — Amin, Turocy & Watson, LLP

(57) ABSTRACT

A processor comprises a computational array of computational elements and an instruction dispatch circuit. The computational elements receive data operands via data lanes extending along a first dimension, and processes the operands based upon instructions received from the instruction dispatch circuit via instruction lanes extending along a second dimension. The instruction dispatch circuit receives raw instructions, and comprises an instruction dispatch unit (IDU) processor that processes a set of raw instructions to generate processed instructions for dispatch to the computational elements, where the number of processed instructions is not equal to the number of instructions of the set of raw instructions. The processed instructions are dispatched to columns of the computational array via a plurality of instruction queues, wherein an instruction vector of instructions is shifted between adjacent instruction queues in a first direction, and dispatches instructions to the computational elements in a second direction.

20 Claims, 12 Drawing Sheets

(51) Int. Cl.
*G06F 5/01* (2006.01)
*G06F 9/38* (2018.01)

(56) References Cited

U.S. PATENT DOCUMENTS

| | | | |
|---|---|---|---|
| 5,146,543 A | 9/1992 | Vassiliadis et al. |
| 5,179,702 A | 1/1993 | Spix et al. |
| 5,333,279 A | 7/1994 | Dunning |
| 5,379,440 A | 1/1995 | Kelly et al. |
| 5,488,729 A | 1/1996 | Vegesna et al. |
| 5,541,914 A | 7/1996 | Krishnamoorthy et al. |
| 5,590,083 A | 12/1996 | Pinkham et al. |
| 5,594,915 A | 1/1997 | Atalla |
| 5,794,062 A | 8/1998 | Baxter |
| 5,796,745 A | 8/1998 | Adams et al. |
| 5,842,034 A | 11/1998 | Bolstad et al. |
| 5,889,413 A | 3/1999 | Bauer |
| 5,898,881 A | 4/1999 | Miura et al. |
| 5,958,041 A | 9/1999 | Petolino, Jr. et al. |
| 6,181,164 B1 | 1/2001 | Miller |
| 6,243,808 B1 | 6/2001 | Wang |
| 6,279,057 B1 | 8/2001 | Westby |
| 6,298,162 B1 | 10/2001 | Sutha et al. |
| 6,681,316 B1 | 1/2004 | Clermidy et al. |
| 6,712,313 B2 | 3/2004 | Zoppitelli et al. |
| 6,988,181 B2 | 1/2006 | Saulsbury et al. |
| 7,015,913 B1 | 3/2006 | Lindholm et al. |
| 7,181,484 B2 | 2/2007 | Stribaek et al. |
| 7,236,995 B2 | 6/2007 | Hinds |
| 7,272,730 B1 | 9/2007 | Acquaviva et al. |
| 7,339,941 B2 | 3/2008 | Twomey |
| 7,421,559 B1 | 9/2008 | Yadav |
| 7,640,528 B1 | 12/2009 | Baeckler |
| 7,805,392 B1 | 9/2010 | Steele et al. |
| 7,861,060 B1 | 12/2010 | Nickolls et al. |
| 7,912,889 B1 | 3/2011 | Juffa et al. |
| 7,965,725 B2 | 6/2011 | Langevin et al. |
| 8,038,539 B2 | 10/2011 | Stamps et al. |
| 8,089,959 B2 | 1/2012 | Szymanski |
| 8,250,555 B1 | 8/2012 | Lee et al. |
| 8,286,172 B2 | 10/2012 | Chakradhar et al. |
| 8,345,540 B2 | 1/2013 | Rollins |
| 8,370,280 B1 | 2/2013 | Lin et al. |
| 8,407,167 B1 | 3/2013 | Abts et al. |
| 8,583,895 B2 * | 11/2013 | Jacobs ............... G06F 9/30156 |
| | | | 712/24 |
| 8,655,937 B1 | 2/2014 | Vanderspek |
| 8,689,202 B1 | 4/2014 | Braun et al. |
| 8,830,993 B1 | 9/2014 | Dublin et al. |
| 8,850,262 B2 | 9/2014 | Cardinell et al. |
| 8,989,220 B2 | 3/2015 | Scrobohaci et al. |
| 9,009,660 B1 | 4/2015 | Griffin et al. |
| 9,146,747 B2 | 9/2015 | Moloney et al. |
| 9,304,775 B1 | 4/2016 | Lindholm et al. |
| 9,388,862 B2 | 7/2016 | Lidak |
| 9,432,298 B1 | 8/2016 | Smith |
| 9,442,757 B2 | 9/2016 | Munshi et al. |
| 9,535,869 B2 | 1/2017 | Zheng |
| 9,639,490 B2 | 5/2017 | Blankenship et al. |
| 9,672,188 B2 | 6/2017 | Vorbach |
| 9,690,938 B1 | 6/2017 | Saxe et al. |
| 9,691,019 B1 | 6/2017 | Gulland et al. |
| 9,697,463 B2 * | 7/2017 | Ross ............... G06N 3/0454 |
| 9,710,265 B1 | 7/2017 | Temam et al. |
| 9,710,748 B2 | 7/2017 | Ross et al. |
| 9,723,317 B2 | 8/2017 | Hattori |
| 9,805,303 B2 | 10/2017 | Ross et al. |
| 10,073,816 B1 | 9/2018 | Lu et al. |
| 10,167,800 B1 | 1/2019 | Chung et al. |
| 10,175,980 B2 * | 1/2019 | Temam ............... G06F 13/28 |
| 10,235,735 B2 | 3/2019 | Venkatesh et al. |
| 10,320,390 B1 | 6/2019 | Ross |
| 10,489,680 B2 | 11/2019 | Aliabadi et al. |
| 10,521,488 B1 | 12/2019 | Ross et al. |
| 10,754,621 B2 | 8/2020 | Thorson |
| 10,776,110 B2 | 9/2020 | Pearce et al. |
| 10,936,569 B1 | 3/2021 | Baskaran et al. |
| 11,086,623 B2 | 8/2021 | Valentine et al. |
| 2001/0051860 A1 | 12/2001 | Copeland et al. |
| 2002/0060796 A1 | 5/2002 | Kanno et al. |
| 2002/0103961 A1 | 8/2002 | Ayukawa et al. |
| 2003/0095547 A1 | 5/2003 | Schofield |
| 2003/0206527 A1 | 11/2003 | Mm |
| 2004/0078555 A1 | 4/2004 | Porten et al. |
| 2004/0150543 A1 | 8/2004 | Wang et al. |
| 2004/0215679 A1 | 10/2004 | Beaumont |
| 2005/0125594 A1 | 6/2005 | Mattausch et al. |
| 2005/0278505 A1 | 12/2005 | Lim et al. |
| 2006/0161338 A1 | 7/2006 | Sohn et al. |
| 2006/0179207 A1 | 8/2006 | Eisen et al. |
| 2006/0190519 A1 | 8/2006 | Stribaek et al. |
| 2006/0225061 A1 | 10/2006 | Ludwig et al. |
| 2007/0124732 A1 | 5/2007 | Lia et al. |
| 2008/0126761 A1 | 5/2008 | Fontenot et al. |
| 2008/0209181 A1 | 8/2008 | Petkov et al. |
| 2008/0244135 A1 | 10/2008 | Akesson et al. |
| 2008/0301354 A1 | 12/2008 | Bekooij |
| 2009/0138534 A1 | 5/2009 | Lee et al. |
| 2009/0150621 A1 | 6/2009 | Lee |
| 2011/0022791 A1 | 1/2011 | Yer et al. |
| 2011/0173258 A1 | 7/2011 | Arimilli et al. |
| 2011/0273459 A1 | 11/2011 | Letellier et al. |
| 2011/0320698 A1 | 12/2011 | Wang et al. |
| 2012/0072699 A1 | 3/2012 | Vorbach et al. |
| 2012/0127818 A1 | 5/2012 | Levy et al. |
| 2012/0159507 A1 | 6/2012 | Kwon et al. |
| 2012/0240185 A1 | 9/2012 | Kapoor et al. |
| 2012/0275545 A1 | 11/2012 | Utsunomiya et al. |
| 2012/0303933 A1 | 11/2012 | Manet et al. |
| 2012/0317065 A1 | 12/2012 | Bernstein et al. |
| 2012/0331197 A1 | 12/2012 | Campbell et al. |
| 2013/0010636 A1 | 1/2013 | Regula |
| 2013/0070588 A1 | 3/2013 | Steele et al. |
| 2013/0212277 A1 | 8/2013 | Bodik et al. |
| 2014/0047211 A1 | 2/2014 | Fleischer et al. |
| 2014/0115301 A1 | 4/2014 | Sanghai et al. |
| 2014/0181171 A1 | 6/2014 | Dourbal |
| 2014/0201755 A1 | 7/2014 | Munshi et al. |
| 2014/0281284 A1 | 9/2014 | Block et al. |
| 2015/0046678 A1 | 2/2015 | Moloney et al. |
| 2015/0378639 A1 | 12/2015 | Chien et al. |
| 2015/0379429 A1 | 12/2015 | Lee et al. |
| 2016/0062947 A1 | 3/2016 | Chetlur et al. |
| 2016/0246506 A1 | 8/2016 | Hebig et al. |
| 2016/0328158 A1 | 11/2016 | Bromberg et al. |
| 2016/0337484 A1 | 11/2016 | Tola |
| 2016/0342892 A1 | 11/2016 | Ross |
| 2016/0342893 A1 | 11/2016 | Ross et al. |
| 2016/0371093 A1 | 12/2016 | Chang |
| 2017/0032281 A1 | 2/2017 | Hsu |
| 2017/0063609 A1 | 3/2017 | Philip et al. |
| 2017/0085475 A1 | 3/2017 | Cheng et al. |
| 2017/0103316 A1 | 4/2017 | Ross et al. |
| 2017/0139677 A1 | 5/2017 | Lutz et al. |
| 2017/0168990 A1 | 6/2017 | Kernert et al. |
| 2017/0177352 A1 | 6/2017 | Ould-Ahmed-Vall |
| 2017/0220719 A1 | 8/2017 | Elrabaa et al. |
| 2017/0331881 A1 | 11/2017 | Chandramouli et al. |
| 2017/0347109 A1 | 11/2017 | Hendry et al. |
| 2017/0372202 A1 | 12/2017 | Ginsburg et al. |
| 2018/0046903 A1 * | 2/2018 | Yao ............... G06N 3/082 |
| 2018/0046907 A1 | 2/2018 | Ross et al. |
| 2018/0075338 A1 | 3/2018 | Gokmen |
| 2018/0121196 A1 | 5/2018 | Temam et al. |
| 2018/0121796 A1 | 5/2018 | Deisher et al. |
| 2018/0145850 A1 | 5/2018 | Tam et al. |
| 2018/0157966 A1 | 6/2018 | Henry et al. |
| 2018/0191537 A1 | 7/2018 | Xiong et al. |
| 2018/0198730 A1 | 7/2018 | Cook et al. |
| 2018/0247190 A1 | 8/2018 | Chung et al. |
| 2018/0267932 A1 | 9/2018 | Zhu et al. |
| 2018/0314671 A1 | 11/2018 | Zhang et al. |
| 2018/0315157 A1 | 11/2018 | Ould-Ahmed-Vall et al. |
| 2018/0329479 A1 | 11/2018 | Meixner |

(56) References Cited

U.S. PATENT DOCUMENTS

| | | |
|---|---|---|
| 2018/0357019 A1 | 12/2018 | Karr et al. |
| 2019/0089619 A1 | 3/2019 | Yeager et al. |
| 2019/0206454 A1 | 7/2019 | Ross et al. |
| 2019/0244080 A1 | 8/2019 | Li et al. |
| 2019/0303147 A1 | 10/2019 | Brewer |
| 2019/0311243 A1 | 10/2019 | Whatmough et al. |
| 2019/0370645 A1 | 12/2019 | Lee et al. |
| 2020/0117993 A1 | 4/2020 | Martinez-Canales et al. |
| 2020/0192701 A1 | 6/2020 | Horowitz et al. |
| 2020/0285605 A1 | 9/2020 | Nam |

FOREIGN PATENT DOCUMENTS

| | | |
|---|---|---|
| JP | 2017-062781 A | 3/2017 |
| TW | 200926033 A | 6/2009 |
| TW | 201706871 A | 2/2017 |
| TW | 201706917 A | 2/2017 |
| TW | 201732560 A | 9/2017 |
| TW | 201804320 A | 2/2018 |
| TW | 201810538 A | 3/2018 |
| WO | 2016/186826 A1 | 11/2016 |

OTHER PUBLICATIONS

Groq, "Groq Announces World's First Architecture Capable of 1,000,000,000,000,000 Operations per Second on a Single Chip," Nov. 14, 2019, three pages, [Online] [Retrieved on Jan. 12, 2021] Retrieved from the Internet <URL: https://www.prnewswire.com/news-releases/groq-announces-worlds-first-architecture-capable-of-1-000-000-000-000-000-operations-per-second-on-a-single-chip-300958743.html>.

United States Office Action, U.S. Appl. No. 16/132,243, dated Aug. 10, 2020, 20 pages.

United States Office Action, U.S. Appl. No. 16/132,243, dated Dec. 31, 2019, 15 pages.

Wang, X. et al., "HERA: A Reconfigurable and Mixed-Mode Parallel Computing Engine on Platform FPGAS," Jan. 2004, pp. 1-6.

Abts, D. et al., "Think Fast: A Tensor Streaming Processor (TSP) for Accelerating Deep Learning Workloads," 2020 ACM/IEEE 47th Annual International Symposium on Computer Architecture, May 2020, pp. 145-158.

Chang, W., "Computer Organization," CSC137. Sacramento State University, Spring Semester 2020, pp. 1-37.

De, A. et al., "Fast Integer Multiplication Using Modular Arithmetic," SIAM Journal on Computing, vol. 42, No. 2, Apr. 18, 2013, pp. 1-18.

Haidar, A. et al., "Harnessing GPU Tensor Cores for Fast FP16 Arithmetic to Speed up Mixed-Precision Iterative Refinement Solvers," SC18, Nov. 11-16, 2018, pp. 1-11.

Johnson, J., "Making floating point math highly efficient for AI hardware," Nov. 8, 2018, nine pages, [Online] [Retrieved on Jan. 20, 2021] Retrieved from the Internet <URL: https://engineering.fb.com/2018/11/08/ai-research/floating-point-math/>.

Lopes, A.R. et al., "A Fused Hybrid Floating-Point and Fixed-Point Dot-product for FPGAs," International Symposium on Applied Reconfigurable Computing, Mar. 2010, pp. 157-168.

PCT International Search Report and Written Opinion, PCT Application No. PCT/US20/62241, dated Feb. 11, 2021, 20 pages.

Wikipedia, "Complex instruction set computer," Last edited Dec. 27, 2020, pp. 1-5, [Online] [Retrieved Jan. 20, 2021] Retrieved from the Internet <URL: https://en.wikipedia.org/wiki/Complex_instruction_set_computer>.

Wikipedia, "Harvard architecture," Last edited Mar. 4, 2020, pp. 1-4, [Online] [Retrieved Jan. 20, 2021] Retrieved from the Internet <URL: https://en.wikipedia.org/wiki/Harvard_architecture>.

Wikipedia, "Instruction pipelining," Last edited Jan. 14, 2021, pp. 1-8, [Online] [Retrieved Jan. 8, 2021] Retrieved from the Internet <URL: https://en.wikipedia.org/wiki/Instruction_pipelining>.

Wikipedia, "Parallel computing," Last edited Jan. 16, 2021, pp. 1-12, [Online] [Retrieved Jan. 22, 2021] Retrieved from the Internet <URL: https://en.wikipedia.org/wiki/Parallel_computing>.

Wikipedia, "Reduced instruction set computer," Last edited Jan. 14, 2021, pp. 1-10, [Online] [Retrieved Jan. 20, 2021] Retrieved from the Internet <URL: https://en.wikipedia.org/wiki/Reduced_instruction_set_computer>.

Wikipedia, "SIMD," Last edited Dec. 18, 2020, pp. 1-9, [Online] [Retrieved Jan. 22, 2021] Retrieved from the Internet <URL: https://en.wikipedia.org/wiki/SIMD>.

Wikipedia, "Tensor," Last edited Jan. 10, 2021, pp. 1-20, [Online] [Retrieved Jan. 15, 2021] Retrieved from the Internet <URL: https://en.wikipedia.org/wiki/Tensor>.

Jouppi, N.P. et al., "In-Datacenter Performance Analysis of a Tensor Processing Unit," ISCA '17, Jun. 2017, pp. 1-12.

United States Office Action, U.S. Appl. No. 17/105,976, dated Sep. 30, 2021, 18 pages.

International Search Report and Written Opinion received for International PCT Application Serial No. PCT/US2019/062303 dated Mar. 25, 2020, 14 pages.

Non Final Office Action received for U.S. Appl. No. 16/686,864 dated Jun. 1, 2021, 22 pages.

Non Final Office Action received for U.S. Appl. No. 16/686,866 dated Sep. 23, 2021, 25 pages.

Non Final Office Action received for U.S. Appl. No. 16/686,858 dated Jan. 25, 2022, 32 pages.

Non Final Office Action received for U.S. Appl. No. 17/519,425 dated Jan. 26, 2023, 17 pages.

Bustamam et al. "Fast Parallel Markov Clustering in Bioinformatics Using Massively Parallel Computing on GPU with CUDA And ELLPACK-R Sparse Format," IEEE/ACM Transactions on Computational Biology and Bioinformatics, vol. 9, No. 3, Mar. 22, 2012, pp. 679-692.

Bouaziz et al., "Parallel Long Short-Term Memory for Multi-Stream Classification," IEEE Spoken Language Technology Workshop, Dec. 13-16, 2016, pp. 218-223.

Fuchs et al., "Parallel Vectors Criteria for Unsteady Flow Vortices," IEEE Transactions on Visualization and Computer Graphics, vol. 14, No. 3, May-Jun. 2008, pp. 615-626.

Gelder et al., "Using PVsolve to Analyze and Locate Positions of Parallel Vectors," IEEE Transactions on Visualization and Computer Graphics, vol. 15, No. 4, Jul.-Aug. 2009, pp. 682-695.

Gil-Cacho et al., "Nonlinear Acoustic Echo Cancellation Based on a Parallel-Cascade Kernel Affine Projection Algorithm," IEEE International Conference on Acoustics, Speech and Signal Processing, Mar. 25-30, 2012, pp. 33-36.

Japan Patent Office, Office Action, Japanese Patent Application No. 2021-527941 dated Dec. 20, 2022, 11 pages (Including English Translation).

Request for the Submission of an Opinion received for Korean Patent Application Serial No. 10-2021-7012323 dated Aug. 29, 2022, 10 pages (Including English Translation).

Rodrigues et al., "SIMDization of Small Tensor Multiplication Kernels for Wide SIMD Vector Processors," 4th Workshop on Programming Models for SIMDNector Processing, Feb. 2018, pp. 1-8.

Suh et al., "A Performance Analysis of PIM, Stream Processing, and Tiled Processing on Memory-Intensive Signal Processing Kernels," 30th Annual International Symposium on Computer Architecture, Jun. 2003, pp. 410-421.

Office Action received for Taiwan Patent Application Serial No. 108142039 dated Jan. 3, 2023, 28 pages (Including English Translation).

Non Final Office Action received for U.S. Appl. No. 16/686,870 dated May 27, 2022, 61 pages.

Final Office Action received for U.S. Appl. No. 16/686,858 dated Jun. 29, 2022, 23 pages.

Notice of Allowance received for U.S. Appl. No. 17/519,425 dated Mar. 15, 2023, 25 pages.

Notice of Allowance received for U.S. Appl. No. 16/686,858 dated Aug. 3, 2022, 25 pages.

Notice of Allowance received for U.S. Appl. No. 16/686,864 dated Jul. 29, 2021, 14 pages.

(56) References Cited

OTHER PUBLICATIONS

Notice of Allowance received for U.S. Appl. No. 16/686,866 dated Dec. 7, 2021, 13 pages.
Notice of Allowance received for U.S. Appl. No. 16/686,870 dated Aug. 17, 2022, 54 pages.
Notice of Allowance received for U.S. Appl. No. 16/686,870 dated Aug. 24, 2022, 5 pages.
Notice of Allowance received for U.S. Appl. No. 16/686,870 dated Oct. 25, 2022, 5 pages.
Non Final Office Action received for U.S. Appl. No. 17/203,214 dated Mar. 15, 2023, 52 pages.
Dey et al., "Fast Integer Multiplication Using Modular Arithmetic", The proceedings of the 40th ACM Symposium on Theory of Computing, 2008, 7 pages.
Narksith et al., "Switch adjusting on hierarchical shuffle-exchange networks for all-to-all personalized exchange," The 2013 10th International Joint Conference on Computer Science and Software Engineering, May 29-31, 2013, pp. 121-126.
International Search Report and Written Opinion received for PCT Application Serial No. PCT/US2019/048568 dated Nov. 20, 2019, 7 pages.
International Search Report and Written Opinion received for PCT Application Serial No. PCT/US2019/068767 dated Mar. 17, 2020, 10 pages.
International Search Report and Written Opinion received for PCT Application Serial No. PCT/US2019/022357 dated Nov. 7, 2019, 10 pages.
Ren et al., "Permutation Capability of Optical Cantor Network", IEEE, Dec. 2007, pp. 398-403.
Taiwanese Intellectual Property Office, Office Action, TW Patent Application No. 108109969, dated Feb. 14, 2020, 12 pages(Including English Translation).
Non Final Office Action received for U.S. Appl. No. 16/117,763 dated Oct. 24, 2019, 17 pages.
Waksman, A. "A Permutation Network," Journal of the Association for Computing Machinery, vol. 15, No. 1, Jan. 1968, pp. 159-163.
Yang et al., "Fast subword permutation instructions based on butterfly network," Proceedings of SPIE, Media Processor 2000, Jan. 27-28, 2000, pp. 80-86.
Office Action received for Taiwan Patent Application Serial No. 108131334 dated Jun. 30, 2022, 6 pages (Including English Translation).
Non Final Office Action received for U.S. Appl. No. 16/932,632 dated May 19, 2021, 24 pages.
Non Final Office Action received for U.S. Appl. No. 16/928,958 dated Sep. 21, 2021, 19 pages.
Non Final Office Action received for U.S. Appl. No. 16/928,958 dated Jul. 23, 2021, 19 pages.
Final Office Action received for U.S. Appl. No. 16/928,958 dated Jun. 4, 2021, 18 pages.
Non Final Office Action received for U.S. Appl. No. 16/928,958 dated Apr. 12, 2021, 27 pages.
Non Final Office Action received for U.S. Appl. No. 16/526,936 dated Jul. 1, 2022, 27 pages.
Non Final Office Action received for U.S. Appl. No. 16/277,817 dated May 20, 2020, 37 pages.
Final Office Action received for U.S. Appl. No. 16/243,768 dated Apr. 26, 2021, 26 pages.
Non Final Office Action received for U.S. Appl. No. 16/243,768 dated Sep. 1, 2020, 22 pages.
Non Final Office Action received for U.S. Appl. No. 16/132,196 dated Dec. 8, 2020, 30 pages.
Final Office Action received for U.S. Appl. No. 16/132,196 dated May 20, 2020, 38 pages.
Non Final Office Action received for U.S. Appl. No. 16/132,196 dated Dec. 11, 2019, 29 pages.
Non Final Office Action received for U.S. Appl. No. 17/397,158 dated Oct. 6, 2022, 47 pages.
Non Final Office Action received for U.S. Appl. No. 17/528,609 dated Jan. 4, 2023, 26 pages.
United States Office Action, U.S. Appl. No. 17/582,895, dated Apr. 6, 2023, 21 pages.
Non Final Office Action received for U.S. Appl. No. 17/532,694 dated Jan. 19, 2023, 27 oaaes.
Notice of Allowance received for U.S. Appl. No. 16/132,196 dated Apr. 30, 2021, 35 pages.
Notice of Allowance received for U.S. Appl. No. 17/397,158 dated Mar. 22, 2023, 39 pages.
Notice of Allowance received for U.S. Appl. No. 16/243,768 dated May 21, 2021, 30 pages.
Notice of Allowance received for U.S. Appl. No. 16/132,102 dated Jul. 1, 2021, 26 pages.
Notice of Allowance received for U.S. Appl. No. 16/526,916 dated Sep. 20, 2021, 28 pages.
Notice of Allowance received for U.S. Appl. No. 16/526,922 dated Aug. 27, 2021, 25 pages.
Notice of Allowance received for U.S. Appl. No. 16/526,936 dated Oct. 13, 2022, 23 pages.
Notice of Allowance received for U.S. Appl. No. 17/528,609 dated Jan. 30, 2023, 27 pages.
Notice of Allowance received for U.S. Appl. No. 17/532,694 dated Feb. 10, 2023, 27 pages.
Notice of Allowance received for U.S. Appl. No. 16/932,632 dated Sep. 9, 2021, 25 pages.
Notice of Allowance received for U.S. Appl. No. 16/277,817 dated Sep. 30, 2020, 34 pages.
Notice of Allowance received for U.S. Appl. No. 16/928,958 dated Dec. 17, 2021, 16 pages.
Notice of Allowance received for U.S. Appl. No. 16/117,763 dated Apr. 14, 2020, 17 pages.
Notice of Allowance received for U.S. Appl. No. 16/117,763 dated Jun. 8, 2020, 5 pages.
Notice of Intent to Grant for European Patent Application Serial No. 19765954.3 dated Feb. 17, 2023, 74 pages.
Notice of Intent to Grant for European Patent Application No. 19765954.3 dated Oct. 17, 2022, 41 pages.
Communication Pursuant to Article 94(3) EPC received for European Patent Application Serial No. 19765954.3 dated Feb. 23, 2022, 8 pages.
Notice of Allowance received for U.S. Appl. No. 17/684,337, filed Apr. 13, 2023, 50 pages.
Sotiropoulos et al., Enhancing the Performance of Tiled Loop Execution on to Clusters using Memory Mapped NetworkInterfaces and Pipelined Schedules, 2002, citation 1 page.
Notice of Allowance received for U.S. Appl. No. 17/697,201 dated Feb. 23, 2023, 37 pages.
Notice of Allowance received for U.S. Appl. No. 17/697,201 dated Mar. 7, 2023, 4 pages.
Non Final Office Action received for U.S. Appl. No. 16/132,243 dated Dec. 31, 2019, 28 pages.
Notice of Allowance received for U.S. Appl. No. 16/132,243 dated Jun. 22, 2021, 47 pages.
Notice of Allowance received for U.S. Appl. No. 16/132,243 dated Sep. 30, 2021, 42 pages.
Notice of Allowance received for U.S. Appl. No. 16/132,243 dated Dec. 15, 2021, 19 pages.
Notice of Allowance received for U.S. Appl. No. 16/526,966 dated Feb. 8, 2021, 45 pages.
Notice of Allowance received for U.S. Appl. No. 16/526,966 dated Jun. 21, 2021, 28 pages.
Notice of Allowance received for U.S. Appl. No. 16/526,966 dated Oct. 15, 2021, 30 pages.
Notice of Allowance received for U.S. Appl. No. 16/526,966 dated Jan. 5, 2022, 18 pages.
Communication Pursuant to Article 94(3) EPC received for European Patent Application Serial No. 19827878.0 dated May 22, 2023, 5 pages.
Decision to Grant received for Japanese Patent Application Serial No. 2021-527941 dated Mar. 28, 2023, 5 pages (Including English Translation).
Written Decision on Registration received for Korean Patent Application Serial No. KR20217012323 dated Apr. 24, 2023, 12 pages (Including English Translation).

(56) References Cited

OTHER PUBLICATIONS

Groq, Inc. "The Challenge of Batch Size 1: Groq Adds Responsiveness to Inference Performance" White Paper, Apr. 2020, pp. 1-7.
Indian Patent Office, Office Action, Indian Patent Application No. 202247031762, dated Sep. 20, 2022, 6 pages.
Lethin, R.A. "How VLIW Almost Disappeared-and then Proliferated," *IEEE Solid-State Circuits Magazine,* vol. 1, No. 3, Aug. 7, 2009, pp. 15-23.
Mercaldi, M et al. "Instruction Scheduling for a Tiled Dataflow Architecture," *ACM SIGARCH Computer Architecture News,* vol. 34, No. 5, Dec. 2006, pp. 141-150.
Sotiropoulos, A et al. "Enhancing the Performance of Tiled Loop Execution on to Clusters using Memory Mapped Network Interfaces and Pipelined Schedules," *ipdps,* Apr. 2002, pp. 1-9.
Southard, D. "Tensor Streaming Architecture Delivers Unmatched Performance for Compute-Intensive Workloads" Groq White Paper, Nov. 18, 2019, pp. 1-7.
United States Office Action, U.S. Appl. No. 17/684,337, dated Feb. 14, 2023, 14 pages.
United States Office Action, U.S. Appl. No. 17/104,465, dated Nov. 12, 2021, 18 pages.
Notice of Allowance received for U.S. Appl. No. 17/203,214 dated Jul. 19, 2023, 50 pages.
Non-Final office action received for U.S. Appl. No. 18/083,388 dated Jul. 14, 2023, 50 pages.
Notice of Allowance received for U.S. Appl. No. 17/684,337 dated Jul. 3, 2023, 91 pages.
Notice of Allowance received for U.S. Appl. No. 17/519,425 dated Jun. 20, 2023, 60 pages.
Notice of Allowance received for U.S. Appl. No. 17/397,158 dated Aug. 23, 2023, 78 pages.
Notice of Allowance received for U.S. Appl. No. 16/951,938 dated Sep. 5, 2023, 81 pages.
Notice of Allowance received for U.S. Appl. No. 18/083,388 dated Aug. 31, 2023, 25 pages.
Notice of Allowance received for U.S. Appl. No. 17/582,895 dated Aug. 16, 2023, 40 pages.
Decision to Grant a Patent received for European Patent Application Serial No. 19765954.3 dated Jun. 29, 2023, 2 pages.
Office Action received for Taiwan Patent Application Serial No. 11220743060 dated Aug. 1, 2023, 4 pages.
Office Action received for Chinese Patent Application Serial No. 201880006508.9 dated Jul. 19, 2023, 7 pages.
First Office Action received for Chinese Patent Application Serial No. 201980074328.9 dated Aug. 14, 2023, 6 pages (Including English Translation).
Notice of Allowance received for U.S. Appl. No. 17/203,214 dated Aug. 16, 2023, 5 pages.
Notice of Allowance received for U.S. Appl. No. 17/397,158 dated Oct. 2, 2023, 10 pages.
Notice of Allowance received for U.S. Appl. No. 17/582,895 dated Oct. 4, 2023, 12 pages.
Notice of Allowance received for U.S. Appl. No. 18/083,388 dated Oct. 4, 2023, 10 pages.
Non- Final office action received for U.S. Appl. No. 17/203,214 dated Dec. 1, 2023, 82 pages.

\* cited by examiner

PROCESSOR INSTRUCTION DISPATCH CONFIGURATION

CROSS-REFERENCE TO RELATED APPLICATIONS

This application claims priority under 35 U.S.C. § 119(e) to U.S. Provisional Patent Application Ser. No. 62/937,123, titled "Processor Instruction Dispatch Configuration," filed on Nov. 18, 2019, which is hereby incorporated by reference in its entirety.

BACKGROUND

The present disclosure generally relates to computer processor architecture, and more specifically to the function of instruction dispatch as a mechanism in a computer processor architecture.

In a processor, there are many challenges that may decrease the efficiency of a processor. For example, instructions need to be decoded and data for the instructions needs to be retrieved from cache or memory. The decoding of instructions and retrieving of data adds latency to the overall execution of the instructions. Processors generally include a collection of computational elements along with a mechanism to move data to the inputs, and from the outputs, of the computational elements. Processors also have a mechanism for dispatching instructions to the computational elements at the correct time relative to the data input and output.

Prior processor architectures have used instruction dispatch mechanisms that are inefficient for several reasons, such as: inefficient duplication and redundancy of instruction and data circuitry, inconvenient alignment of the timing relationship between the instruction bus and data bus, large storage overhead in main memory code space, high channel bandwidth required to transfer instructions from main memory to the processor. Typically, such processor architectures use a large area of the semiconductor die as a data cache memory and a second large area of the die as an instruction cache for as part of the processor system in an attempt to mitigate some of these shortcomings of the architecture.

SUMMARY

Embodiments are directed to a processor comprising a computational array of computational elements and an instruction dispatch circuit. The computational elements receive data operands via data lanes extending along a first dimension, and processes the operands based upon instructions received from the instruction dispatch circuit via instruction lanes extending along a second dimension. The instruction dispatch circuit receives raw instructions, and comprises an instruction dispatch unit (IDU) processor that processes a set of raw instructions to generate processed instructions for dispatch to the computational elements, where the number of processed instructions is not equal to the number of instructions of the set of raw instructions. The processed instructions are dispatched to columns of the computational array via a plurality of instruction queues, wherein an instruction vector of instructions is shifted between adjacent instruction queues in a first direction, and dispatches instructions to the computational elements in a second direction.

In accordance with some embodiments, a processor, comprises a computational array comprising an array of computational elements and an instruction dispatch circuit configured to provide instructions to the computational elements of the computational array. The instruction dispatch circuit comprises an instruction buffer memory configured to receive, during each of a plurality of compute cycles, a set of input instructions. and an instruction dispatch unit (IDU) processor. The IDU processor is configured to, during each of the plurality of compute cycles, process the set of input instructions received by the instruction buffer memory to generate a plurality of processed instructions, wherein a number of instructions of the plurality of processed instructions is not equal to a number of instructions of the set of input instructions. The instruction buffer memory further comprises a plurality of memory output locations connected to respective sets of computational elements of the computational array from which processed instructions are dispatched to the computational elements of the computational array. In some embodiments, the input instructions are raw instructions, and IDU processor processes the input instructions by performing unpacking, decompression, and/or decryption on the input instructions. In some embodiments, the IDU processor generates a set of duplicate instructions based upon an input instruction.

In accordance with some embodiments, a processor comprises an arrangement of computational elements, and a memory storing data operands configured to, during each of a plurality of time intervals, provide stored data operands to the arrangement of computational elements via one or more data lines that flow in a first direction. The processor further comprises an instruction dispatch circuit configured to receive an array of instructions, and configured to, during each of the plurality of time intervals, shift one or more instruction vectors of the array of instructions along the first direction parallel to the direction of flow of data in the processor, and shift the one or more instruction vectors in a second direction perpendicular to the flow direction to provide an instruction from each instruction vector to the arrangement of computational elements. The arrangement of computational elements is configured to process data operands provided from the memory based upon the provided instructions.

Figure 1:
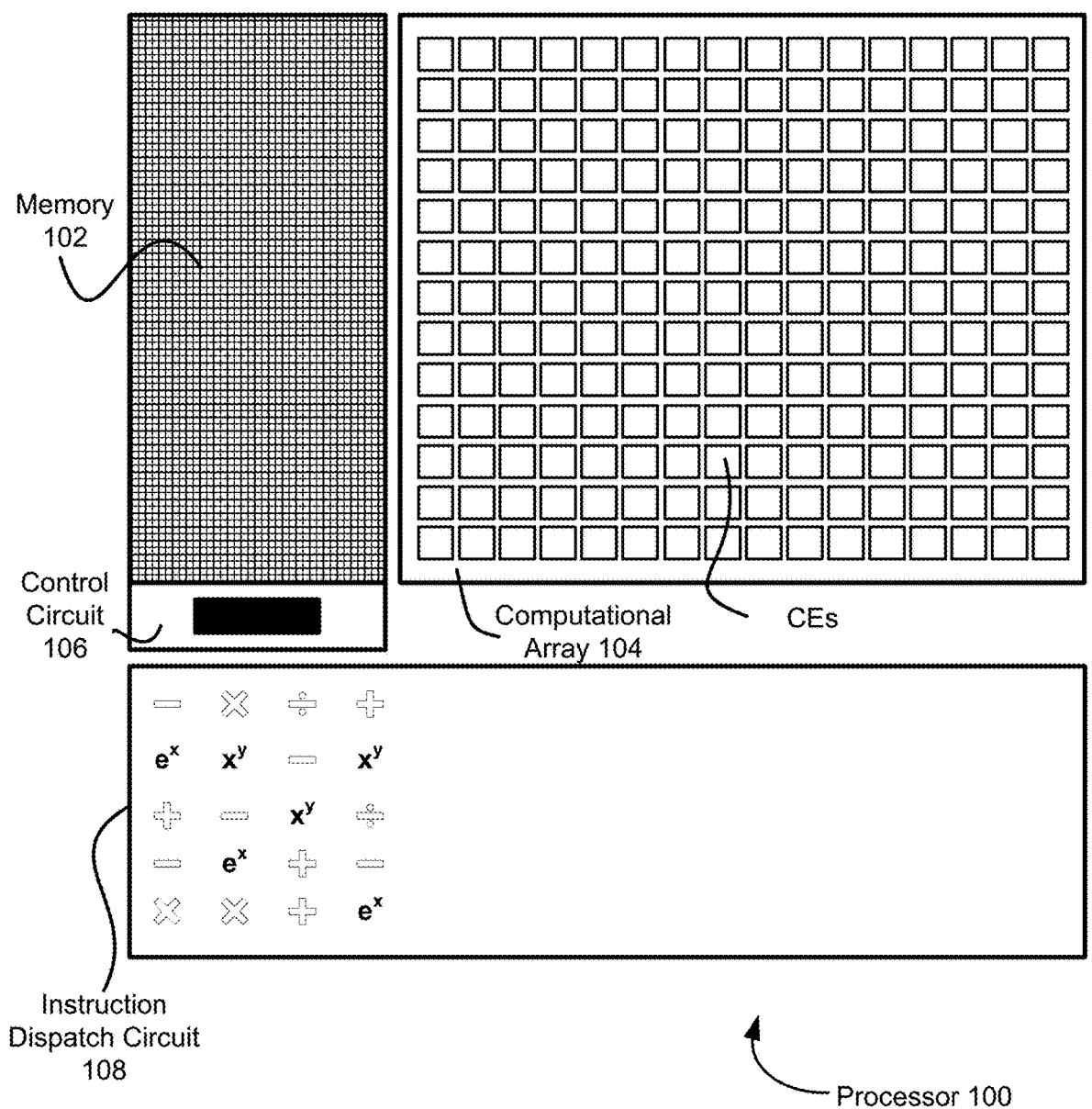
FIG. 1 illustrates a diagram of an example many-core tiled processor microarchitecture.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments are directed to processor configurations that provide an efficient mechanism for dispatching instructions to computational elements, and improves on many of the shortcomings of prior instruction dispatch mechanisms.

Embodiments are directed to a processor configuration having multiple arrays of computational elements. Instructions enter into a queue associated with each array, and are sequentially applied to a subset of the computational elements of each array. The instructions are then shifted across a different subset of the computational elements of each array.

In some embodiments, a processor comprises a plurality of computational elements (CEs), also referred to as tiles, and may correspond to arithmetic-logic units (ALUs), multiplier-accumulators (MAC), permutation units, or a memory array, by way of example. Data operands to be processed by the processor, flow on a temporal axis, and instructions to control the operation of the compute elements using the data operands are dispatched along a spatial axis of the processor array. To illustrate, the data operands initially flow along the temporal axis from the memory to the array. Results may flow along the temporal axis to other elements of the computational array or may be returned to memory. Instructions, either Single Instruction Multiple Data (SIMD) or Multiple Instructions Multiple Data (MIMD), are dispatched to columns of processing elements. In other embodiments, instructions are dispatched to a partial column of processing elements. In both embodiments, instructions are dispatched along the spatial axis. An array of instructions is presented to the processor during each time increment and shifted along the first direction parallel to the primary direction of flow of the rows of data in the processor, while concurrently select portions of the instruction vector may be shifted in a second direction perpendicular to the flow of data in the processor. It is within the scope of the disclosed configuration to allow, during certain timing increments, that the instructions move only in the row direction, or during certain timing increments, the instructions move only in the column direction, to further improve the flexibility and efficiency of instruction dispatch.

In some embodiments, it is understood that the instructions flow in a first direction called the temporal direction because they generally move in step with a timing increment, while concurrently a subset of the instructions also move in a second direction, perpendicular to the first direction, where the second direction is called the spatial direction because the flow in the spatial direction moves the instructions to be dispatched from or to a different space in the array of computational elements in the processor.

In some embodiments, a compiler for the processor calculates timing of the hardware configuration of the processor, and configures the timing of data and instruction flows such that corresponding data and instructions are received at each computational element with a predetermined temporal relationship (e.g., during the same cycle, separated by a predetermined delay, etc.). The predetermined temporal relationship may be based upon the hardware of the processor, a type of instruction, and/or the like. Because the temporal relationship between when data and instructions are received is known, the operand data received by a tile may not need to include any metadata indicating what the data is to be used for. Instead, each tile receives instructions, and based upon the predetermined timing, performs the instruction on the corresponding data that is received in accordance with the predetermined timing, allowing for the data and instructions to flow through the processor more efficiently. For example, because the data and instructions to the computational elements of the processor flow with predetermined timing (e.g., as specified by the compiler), the flow of data and instructions within the processor is deterministic. Due to this determinism, the processor may not need to contain any arbitration logic and/or traffic control logic. Instead, the data and instructions may automatically move along respective data and instruction lanes to reach the computational elements of the processor, which perform instructions on the received data based upon the timing at which the data and instruction reach the computational element. In some embodiments, the flow of data and the flow of instructions within the processor occur separately and independently from each other, and the computational elements of the processor are able to perform the intended instructions on the correct data due to the predetermined timing at which the data and instructions are received, as determined by the compiler.

Architectural Overview

FIG. 1 illustrates a diagram of a processor comprising an arrangement of computational elements, in accordance with some embodiments. As shown in FIG. 1, the processor 100 comprises a memory 102, an array of computational elements 104, a control circuit 106, and instruction dispatch circuit 108. The processor 100 is instantiated on an application specific integrated circuit (ASIC). In some embodiments, the processor is a co-processor that is designed to execute instructions for a predictive model. The predictive model is any model configured to make a prediction from input data. The predictive model uses a classifier to make a classification prediction. In one specific embodiment, the predictive model is a machine learning model such as a tensorflow model, and the processor 100 is a TSP.

As illustrated in FIG. 1, the memory 102 may be positioned adjacent to the array of computational elements 104 (also referred to as computational array 104). For ease of discussion, the left-right direction that spans horizontally across the memory 102 and the computational array 104 is referred to as the horizontal direction or the row direction, while a direction perpendicular to the horizontal direction and spanning across only one of the memory 102 and the computational array 104 may be referred to as the vertical direction of column direction, although it is understood that the terms horizontal/vertical and row/column do not necessary reflect the actual orientation of the processor in accordance with some embodiments.

The control circuit 106 is configured to control operations of the memory 102 and instruction dispatch circuit 108 to provide data and instructions to the computational array 104. In some embodiments, the control circuit 106 receives a compiled program for the compiler, which specifies an order and timing of data and instructions to be provided to the computational array 104. Because the compiler calculates timing based on the hardware configuration of the processor 100, the compiler compiles the program such that the timing of data and instruction flows such that corresponding data and instructions are received at each computational element of the computational array 104 with a predetermined temporal relationship. As the data and instructions to the computational elements of the processor flow with predetermined timing (e.g., as determined by the compiler), the flow of data and instructions within the processor is deterministic and repeatable.

The memory 102 is configured to store data to be processed by the array of computational elements 104. In some embodiments, the data comprises data operands corresponding to weights or activations used to implement a model (e.g., a machine learning model). In some embodiments, the memory 102 comprises an array of memory tiles, each memory tile comprising an SRAM for on-chip storage. In some embodiments, the array of memory tiles is arranged in a plurality of columns and a plurality of rows corresponding to rows of the computational array 104. The rows of memory tiles may transmit data to the rows computational array 104 via respective data lanes (not shown). In addition, the memory tiles may receive computed results data generated by the computational array 104. The received results data may be stored back in the memory tiles or into other memory tiles of the memory 102, and may be used as data for subsequent computation.

In some embodiments, the memory 102 may be coupled to lane switching circuitry (not shown) allowing for data to be routed from one row of the memory or computational array to any other row. In some embodiments, the lane switching circuitry is implemented as a crossbar switch.

In some embodiments, the memory 102 may further store instructions to be executed on the data by the computational elements 104. For example, during operation of the processor 100, the instruction dispatch circuit 108 may retrieve instruction data from the memory 102, and use the retrieved instructions to populate one or more instruction queues, which provide instructions to columns computational elements of the computational array 104 via respective instruction lanes.

The computational array 104 comprises an array of computational elements (CEs), such as arithmetic-logic units (ALUs), multiplier-accumulators (MAC), and/or the like. In some embodiments, the computational elements of the computational array 104 are uniform and are configured to be able to perform the same types of instructions on received data operands. In other embodiments, the computational array 104 comprises different types of computational elements able to perform different types of instructions. In some embodiments, the computational array 104 corresponds to a systolic array used for matrix multiplication, performing convolution, and/or the like. In some embodiments, a computational array is used to implement a machine learning model.

The computational elements of the computational array 104 are configured to receive data operands from the memory 102 in a first, horizontal direction. For example, data operands are transmitted from the memory 102 through data lines that run along each row of the computational array 104. In some embodiment, a computational element is configured to, over a time period (e.g., a clock cycle or compute cycle), receive a data operand via the data lane corresponding to the row of the computational element, perform operations on the received data in accordance with received instructions, and output a result to the data lane to be processed by a subsequent computational element or to be returned for storage in the memory 102. As such, a data operand from the memory 102 may "travel" down a row of computational elements over a plurality of time periods/cycles, being processed by a different computational element during each time period/cycle. Operations performed by a computational element on received data operands are discussed in greater detail below in relation to FIGS. 9 and 10.

In some embodiments, the computational elements of the computational array 104 are configured to receive instructions via instruction lanes (not shown in FIG. 1) corresponding to each column of the computational array 104. For example, each instruction lane may run along a column of the computational array 104, perpendicular to the plurality of data lanes (e.g., which run parallel to rows of the computational array 104). As such, each computational element of the computational array 104 may be located at an intersection of a data lane and an instruction lane, and is configured to process a data operand received via the data lane based upon an instruction received via the instruction lane having a predetermined temporal relationship with the received data operand (e.g., during a same clock cycles, or offset by a predetermined number of clock cycles). Each computational element may, over a plurality of time periods/cycles, receive a plurality of data operands and a plurality of instructions, and process the received data operands in accordance with the received instructions.

The instruction dispatch circuit 108 dispatches instructions (e.g., retrieved from the memory 102) to one or more instruction queues. In some embodiments, the instruction dispatch circuit 108 comprises a respective instruction queue for each column of the computational array 104. Each instruction queue is configured to provide instructions to the computational elements of a corresponding column via a respective instruction lane. In addition, in some embodiments, each instruction queue may be configured to shift its enqueued instructions to another instruction queue (e.g., an adjacent instruction queue in the row direction). Thus, the instruction dispatch circuit 108 may be configured to shift instructions in two directions, e.g., in the row direction to be provided to instruction queues of subsequent columns of the computational array, and in the column direction to be provided to the computational elements of a column of the computational array. Additional details relating to the instruction dispatch circuit and how the instruction dispatch circuit populates the one or more instruction queues are discussed below in relation to FIG. 11.

Instruction Flow

Figure 2:
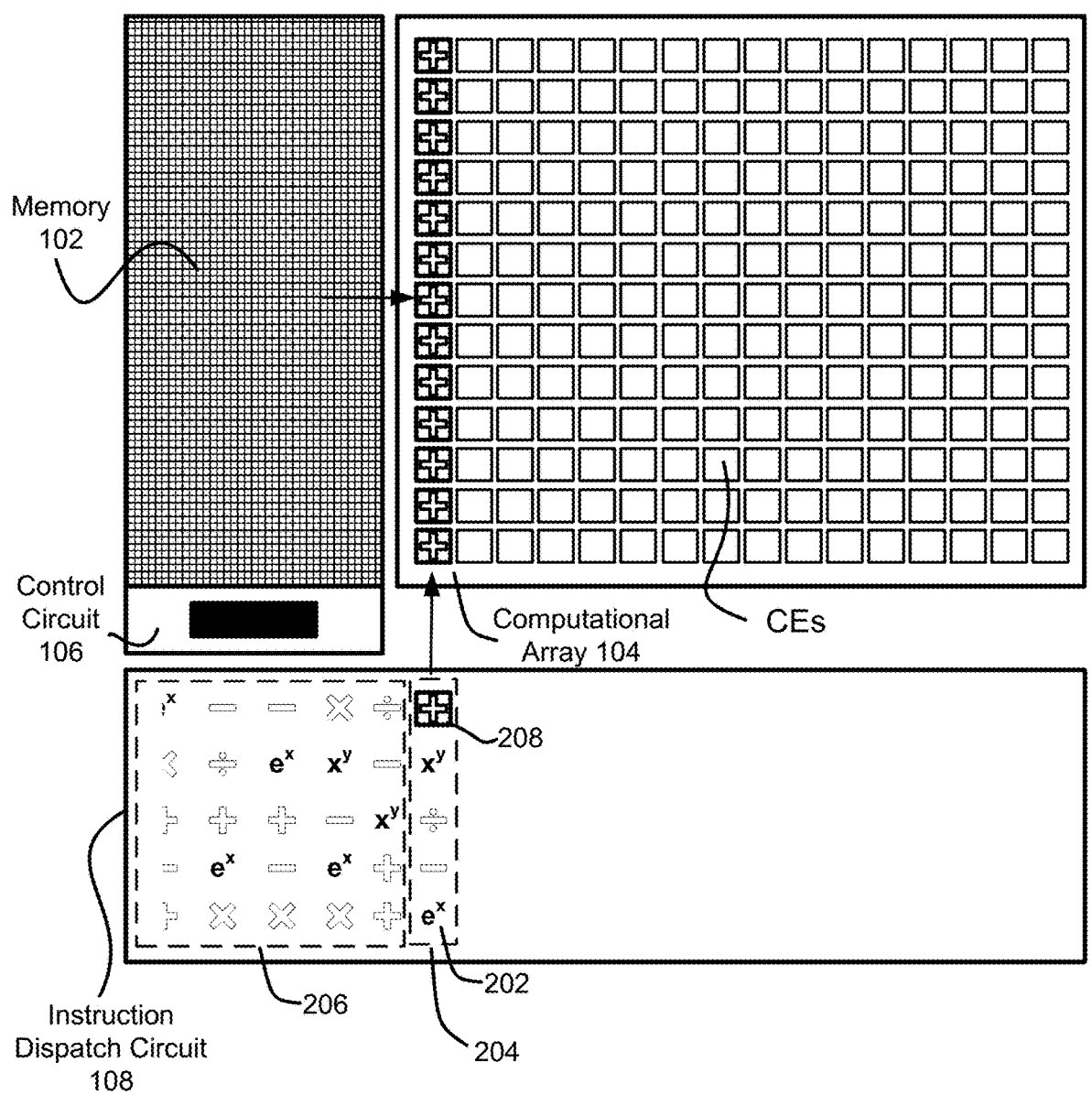
FIG. 2 illustrates the processor during a first time period, in accordance with some embodiments.

FIGS. 2-6 exemplify an example embodiment of an instruction flow configuration that may be used by the processor 100, in accordance with some embodiments. FIG. 2 illustrates the processor 100 during a first time period, in accordance with some embodiments. As illustrated in FIG. 2, the instruction dispatch circuit 108 has enqueued a first set of instructions 302 (also referred to as an "instruction vector") into a first instruction queue 204 corresponding to a first column of the computational array 104. Although FIG. 2 shows that the first instruction queue 204 having five enqueued instructions, it is understood that the instruction queue 204 may comprise a different number of enqueued instructions (e.g., as many instructions as there are columns in the computational array 104).

In addition, FIG. 2 illustrates a number of additional instructions ("Next Instructions" 206) to be enqueued during subsequent clock cycles. In some embodiments, the next instructions 206 correspond to instructions still stored in the memory 102 that have not yet been retrieved by the instruction dispatch circuit 108. In other embodiments, the next instructions 206 include instructions retrieved by the instruction dispatch circuit 108 stored in a queue (e.g., a staging queue) or other memory structure separate from the instruction queues corresponding to the columns of the computational array 104. In some embodiments, the "Next Instructions" 206 comprises an array of instructions.

FIG. 2 further illustrates a first instruction 208 (e.g., an addition instruction, "+") of the first instruction vector 202 enqueued in the first instruction queue 204 provided to the computational elements of the first column of the computational array 104. In some embodiments, the first instruction 208 is provided by the instruction lane associated with the first column to all computational elements of the column. In other embodiments, the first instruction 208 is provided from the first instruction queue 204 via the instruction lane to a first computational element of the column (e.g., a bottommost computational element) during a first time period (e.g., clock cycle), and is propagated to a next computational element of the column via the instruction lane each time period over a plurality of subsequent time periods, until all computational elements of the columns have processed the instruction. When the first instruction 208 is provided to computational elements of the computational array, the first instruction 208 is dequeued from the first instruction queue 204.

Figure 3:
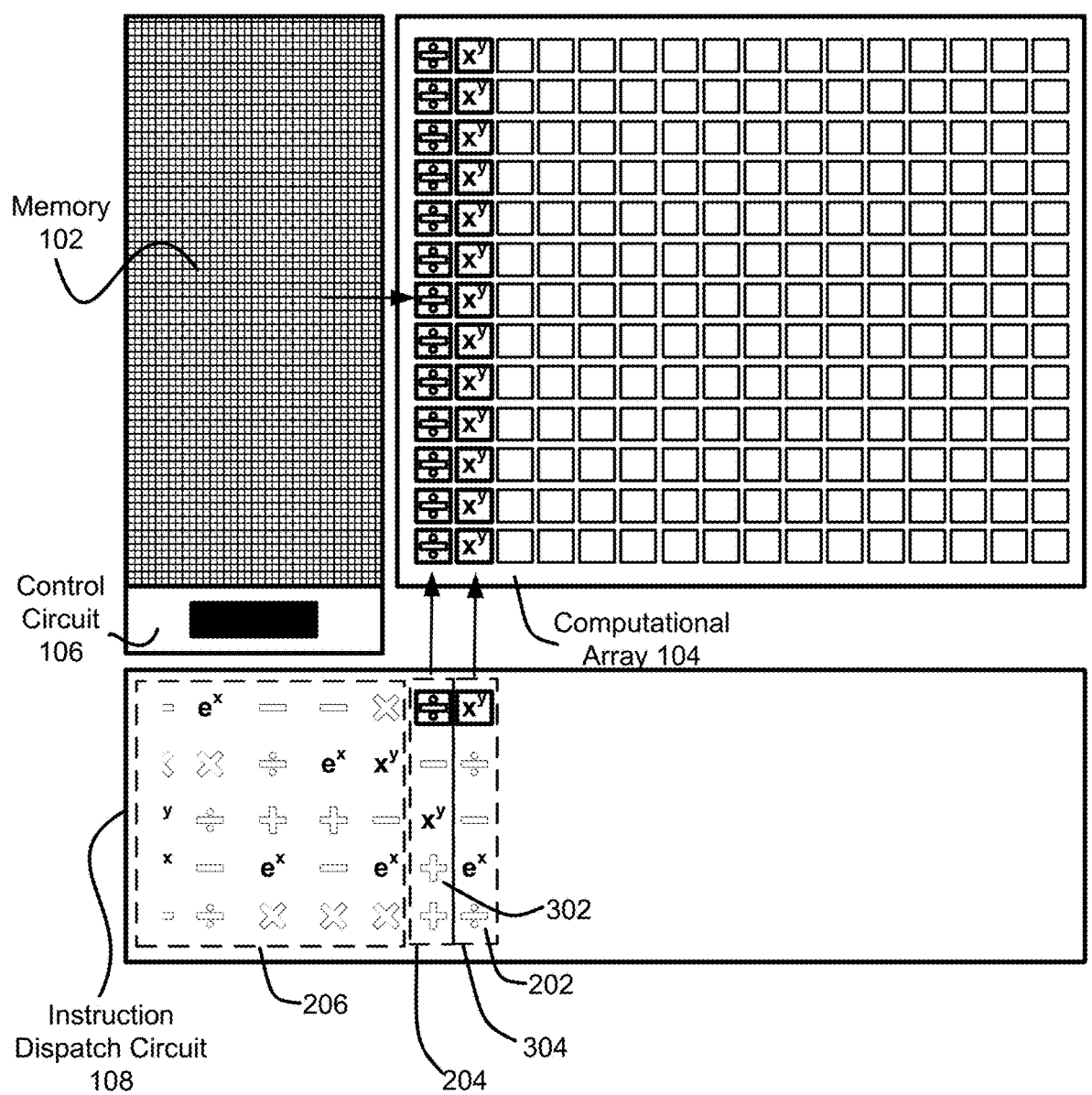
FIG. 3 illustrates the processor during a subsequent time period, in accordance with some embodiments.

In some embodiments, over each subsequent time period, the instruction dispatch circuit 108 shifts the instructions of each instruction queue to a next instruction queue (e.g., in the row direction), as well as causes each instruction queue to provide/dequeue a first instruction to the computational elements of its respective column (e.g., in the column direction). FIG. 3 illustrates the processor 100 during a subsequent time period, in accordance with some embodiments. As illustrated in FIG. 3, the instructions of the first instruction queue 204 illustrated in FIG. 2 are shifted to a second instruction queue 304 corresponding to a second column of the computational array 104, and a next instruction vector (e.g., second instruction vector 302 retrieved from the memory 102 or from a staging queue) shifted into the first instruction queue 204. In addition, the first instruction of each instruction queue is dequeued and provided to the computational elements of respective columns via respective instruction lanes. For example, as shown in FIG. 3, the exponential instruction "$x^3$" is the first instruction of the first instruction vector 202 (due to the addition instruction "+" being dequeued during the previous clock cycle and provided to the computational elements of the first column), and is dequeued and provided to computational elements of the second column, while a first instruction of the next instruction vector shifted to the first instruction queue (e.g., the division instruction "÷") is dequeued and provided to the computational elements of the first column.

Figure 4:
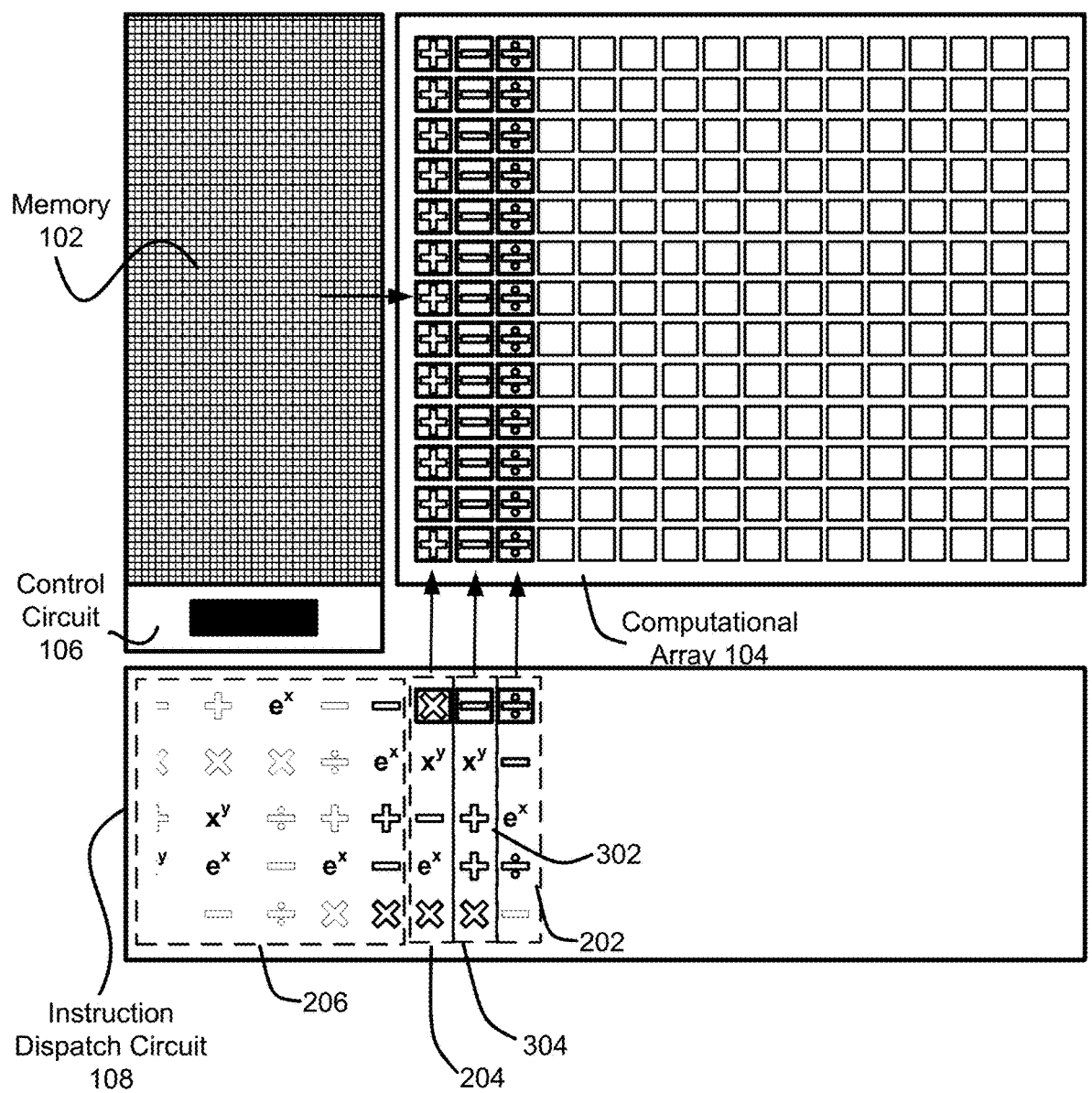
FIGS. 4-5 illustrate the above-described process of the instruction dispatch circuit shifting instructions over a plurality of subsequent cycles, in accordance with some embodiments.
Figure 5:
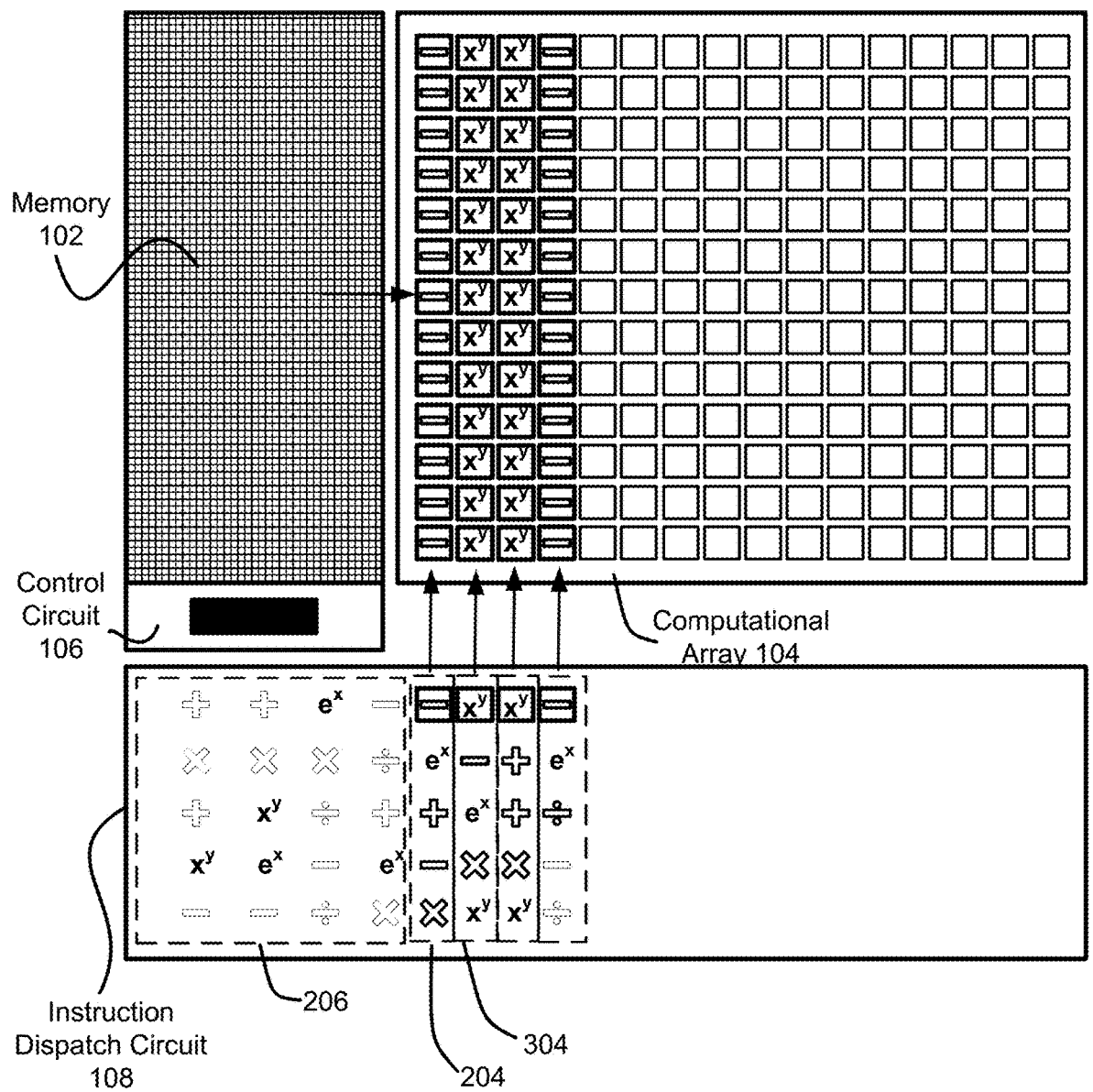

FIGS. 4-5 illustrates the above-described process of the instruction dispatch circuit shifting instructions over a plurality of subsequent cycles, in accordance with some embodiments. For example, FIG. 4 illustrates the first instruction vector 202 shifted to a third instruction queue, and a current first instruction (division instruction "÷") dequeued and provided to computational elements of the third column of the computational array 104, the second instruction vector 302 shifted to the second instruction queue, with the subtraction instruction "−" dequeued and provided to the second column, and a third instruction vector loaded onto the first instruction queue 204, with the multiplication instruction "×" provided to the first column. FIG. 5 illustrates the instructions of each of the first, second, and third sets of instructions further shifted to a next queue, a next (fourth) instruction vector loaded on the first instruction queue 204, and the first instruction of each queue provided to the computational elements of its respective column.

Figure 6:
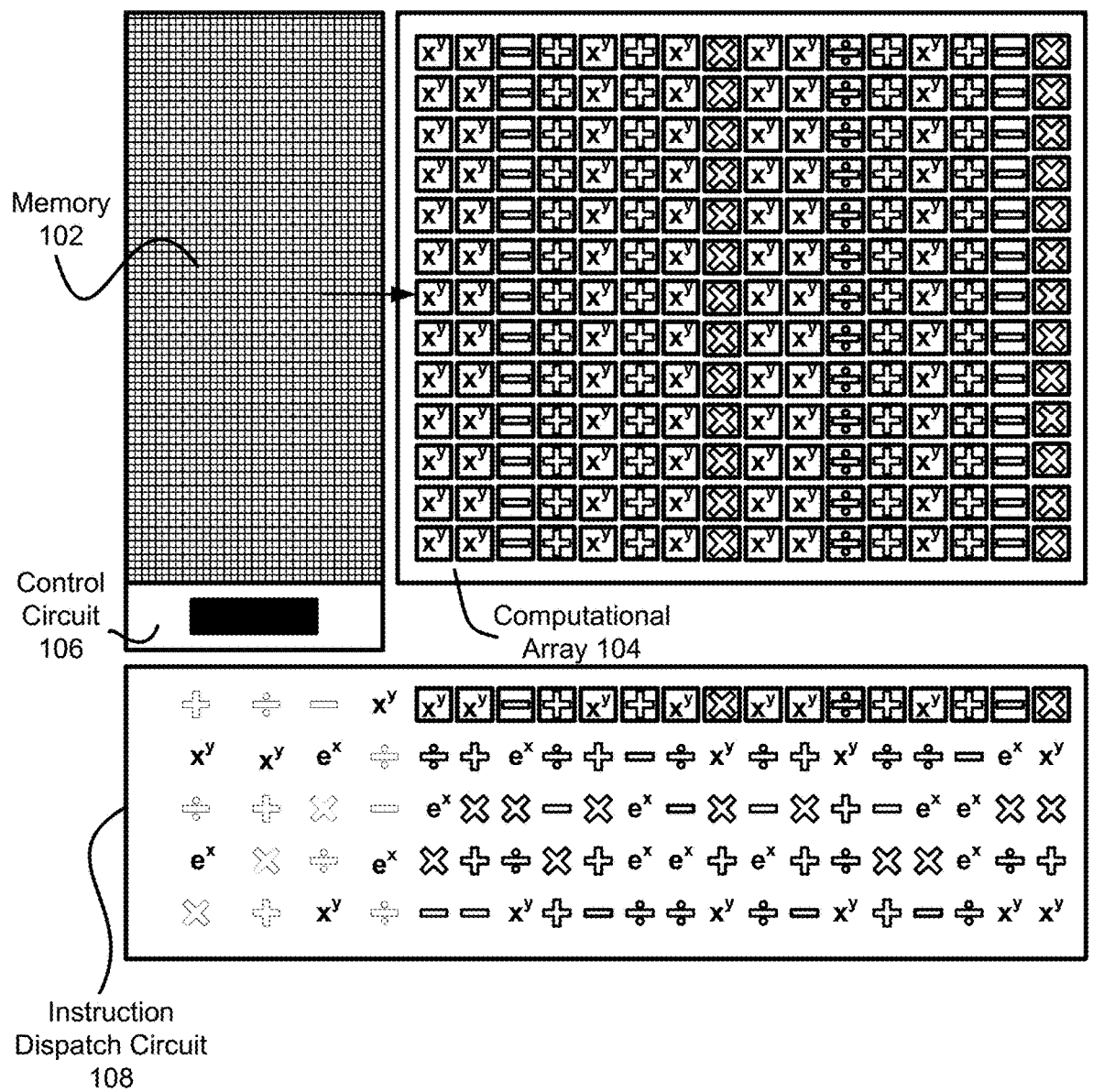
FIG. 6 illustrates the instruction flow following an additional number of cycles, in accordance with some embodiments.

FIG. 6 illustrates the instruction flow following an additional number of cycles, in accordance with some embodiments. As shown in FIG. 6, each instruction queue of the instruction dispatch circuit 108 provides an instruction to the computational elements of a respective column. At each subsequent cycle, each instruction vector is shifted to a next instruction queue corresponding to a next column of the computational array, and a first instruction of the set is dequeued and provided to the computational elements of the column.

As such, the computational elements of the computational array 104 are configured to receive data operands (e.g., from the memory 102) via data lines extending along the rows of the computational array in a first direction (e.g., horizontal direction), and receive instructions (e.g., from the instruction dispatch circuit 108) via instruction lines extending along the columns of the computational array in a second direction (e.g., vertical direction). In some embodiments, each computational element of a first column of the computational array receives a respective data operand from the memory 102, processes the received data operand based on a received instruction, and passes the result to a next computational element in its row. Thus, the timing of data and instruction transmission may be configured such that a first set of data operands (e.g., set of data operands received by the computational elements of the first column of the computational array 104) will be processed based on each instruction of the first instruction vector in sequence. For example, in relation to FIGS. 2-5, during a first clock cycle, a first set of data operands received by the first column of the computational array 104 from the memory 102 is processed based on the first instruction 208 (e.g., addition instruction "+") of the first instruction vector 202, the processed results of which are passed to the computational elements of a next column of the computational array. During a next clock cycle, the processed results may be processed at the second column of the computational array based on a next instruction (e.g., exponential instruction "$x^3$") of the first set of instructions 202, as shown in FIG. 3. Over subsequent cycles, the processed results are further processed at the third column based on the third instruction of the first instruction vector (see FIG. 4), at the fourth column based on the fourth instruction of the first instruction vector (see FIG. 5), and so forth. As each instruction vector (shown in FIGS. 2-6 as a set of instructions occupying a particular instruction queue during a given clock cycle) is shifted to subsequent instruction queues over each cycle, the instruction vector may be used to process the same set of data operands in sequence as the data operands are also shifted across the columns of the computational array 104.

It is understood that in some embodiments, operations of the instruction dispatch circuit 108 may be performed in a different order than that described above. For example, while the above figures illustrate each instruction vector shifted to a next instruction queue and then dequeuing a first instruction, it is understood that in other embodiments, the instruction dispatch circuit 108 may cause each instruction queue to dequeue its first instruction before shifting the instruction vector to a next queue.

Figure 7:
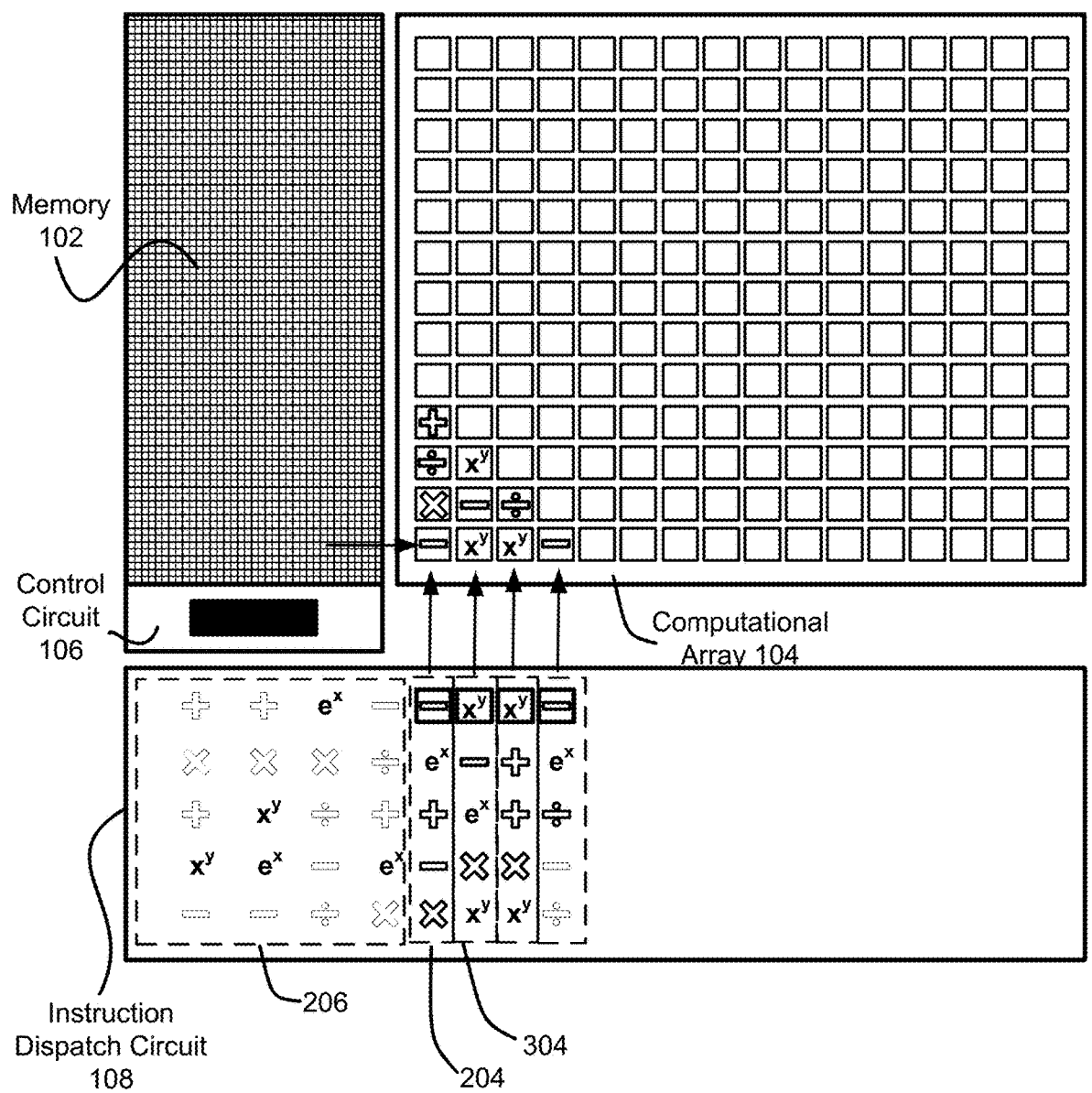
FIG. 7 illustrates an example of dequeued instructions from the instruction queue being provided to one computational element in a column at a time, in accordance with some embodiments.

In addition, while FIGS. 2-6 illustrate each instruction queue providing an instruction to all computational elements of its corresponding column, in other embodiments, each dequeued instruction may be provided via the instruction lane to one computational element of the column during each cycle (e.g., a bottommost computational element of the column). Each cycle, the instruction is passed from the computational element to the next computational element in the column, in other words, the computational elements of the column may receive the instruction in a staggered fashion. FIG. 7 illustrates an example of dequeued instructions from the instruction queue being provided to one computational element in a column at a time, in accordance with some embodiments. Under the instruction dispatch scheme shown in FIG. 7, each computational element of the computational array will receive the same instructions in the same order as illustrated in FIGS. 2-6. For example, each computational element of the first column of the computational array 104 will still receive an addition instruction "+", followed by a division instruction "÷", followed by a multiplication instruction "×", and so forth, the same order as that illustrated in FIGS. 2-6. However, due to the instructions being provided to one computational element of the column at a time instead of being provided to all computational elements of the column during a single cycle, computational elements of each row will receive their instructions a cycle after the row below, e.g., in a "staggered" fashion.

In embodiments where instructions are received by the computational elements of each column in a staggered fashion, transmission of data operands via data lanes across the rows of the computational array may be similarly staggered (e.g., with transmission of data operands to computational elements of upper rows occurring after transmission of data operands to lower rows) to preserve the relative timing at which each computational element receives data and instructions. In addition, it is understood that in other embodiments, a dequeued instruction may be provided to a set of computational elements of the column each cycle (instead of a single computational element), and transmitted via the instruction lane to subsequent sets of computational elements of the column over subsequent cycles.

As such, whether instructions are dispatched to an entire column at once or to a set of one or more computational elements at a time, the order of operations performed by the instruction dispatch circuit 108 may remain the same (e.g., shifting instructions to a subsequent queue, and dispatching/dequeuing a first instruction in each queue each cycle). Instead, the timing of data operand dispatch across the rows of the computational array is adjusted to be staggered in a manner that matches the transmission of dequeued instructions along columns of the computational array, to preserve the relative timing at which each computational element receives data operands and instructions. Under this configuration, each computational element maintains the ability to process a received data operand each cycle based on a received instruction.

While the above figures illustrate, for purpose of example, instructions dispatched by the instruction dispatch circuit 108 as arithmetic instructions, it is understood that the types of instructions that may be managed by the instruction dispatch circuit 108 and processed by the computational elements may include other types of instructions, such as logic instructions, pass-through instructions, etc.

As shown in the figures above, it can be seen in the sequence of images that the instructions in the "Next Instructions" array 206 move in the row direction to the right one position during each timing increment, while concurrently the instructions after the first column also move in the column direction one position up during each timing increment. The figures further exemplify the dispatch of instructions to apply to computational elements in the array of ALUs that comprise the processor.

It may be appreciated that prior approaches that do not make use of this configuration may have used control line configuration mechanisms instead of the inventive instruction queue to determine the behavior of the computational array. The control line configuration approach has limited flexibility that allows for configuration but not programmability. The instruction dispatch mechanism of this configuration increases the functionality of the processor block relative to prior approaches because new instructions can be shifted in along the row direction, or they can be shifted in along the column direction, or the instructions can be shifted in with concurrent row direction and column direction movement. It is a benefit of the present configuration that instructions can be applied to the processor at a rapid rate, allowing for greater flexibility and programmability, where the time increment between the application of different instructions may be faster than reconfiguration mechanisms that may have existed in prior approaches.

While the above figures illustrate the instruction vectors in each instruction queue shifted to a next instruction queue each cycle, in other embodiments, instructions of each instruction vector are shifted only in the column direction. In such embodiments, instructions in the "Next Instructions" array 206, instead of enqueuing next instructions as a new instruction vector into the first instruction queue 204 (and shifting each instruction vector to a next queue), enqueue additional instructions onto the instruction vectors for each queue, maintaining a length of each queue as instructions are dispatched from the queue to the computational array.

Process Flow

Figure 8:
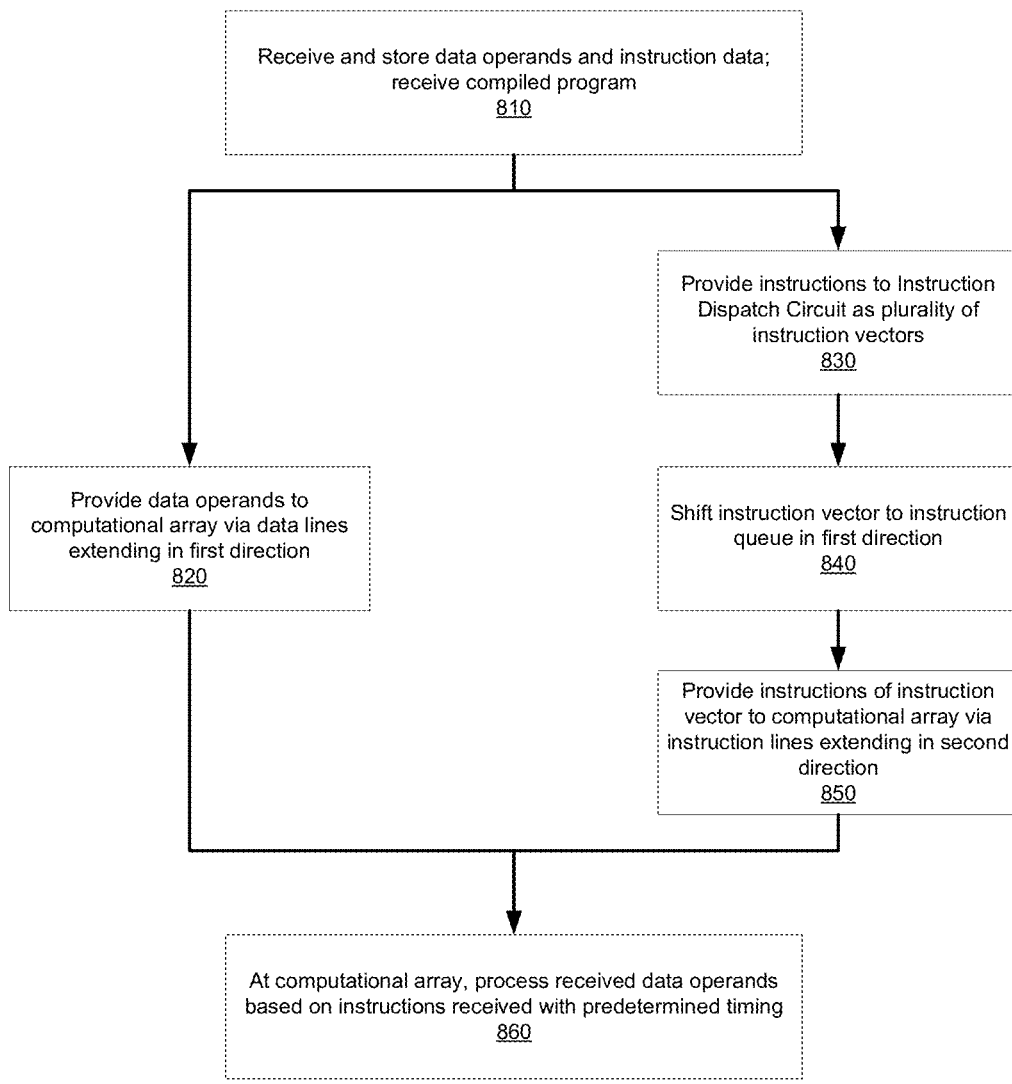
FIG. 8 is a flowchart of an instruction dispatch process, in accordance with some embodiments.

FIG. 8 is a flowchart of an instruction dispatch process, in accordance with some embodiments. The process of FIG. 8 may be executed by a processor 100 such as that illustrated in FIG. 1. At 810, the processor receives and stores data operands and instruction data. The data operands and instruction data may be stored in a memory of the processor (e.g., memory 102). In addition, the processor receives a compiled program from a compiler. The compiled program may indicate a timing and order at which data operands and instructions are to be read from the memory and provided to the computational array of the processor.

The processor executes the compiled program to provide data operands and instructions to the computational array with the predetermined timing as specified by the program. At 820, the processor provides data operands to the computational array via data lines extending in a first direction. In some embodiments, the first direction corresponds to a row direction. In some embodiments, for each row of the computational array, data operands from memory are provided to a first computational element of the row for processing based on a received instruction, the results of which may then be provided to a next computational element along the data line (e.g., next computational element of the row) for processing based on a subsequent instruction. As such, each data operand may "travel" across the computational array, being processed in accordance with received instructions at each computational element.

The processor further concurrently provides instructions to the computational array. At 830, the processor provides instructions to an instruction dispatch circuit as a plurality of instruction vectors. In some embodiments, the plurality of instruction vectors may correspond to an instruction array. The instruction dispatch circuit may manage the provision of instructions to the computational array using a plurality of instruction queues. In some embodiments, each instruction queue is configured to provide instructions to a respective subset (e.g., a respective column) of the computational array. At 840, the instruction dispatch circuit shifts an instruction vector to an instruction queue in the first direction. For example, the instruction dispatch circuit may provide an instruction vector to a first instruction queue. In addition, instructions within the instruction queue are shifted to a next instruction queue in the first direction (e.g., from the first instruction queue corresponding to a first column of the computational array to a second instruction queue corresponding to a second column). At 850, the instruction dispatch circuit further causes the instruction queues to provide instructions to the computational array via instruction lines extending in the second direction. The second direction is perpendicular to the first direction, and may correspond to a column direction. In some embodiments, each instruction queue dequeues a first instruction to be provided to the computational array. Each instruction may be provided to all computational elements within a column of the array, or to a subset thereof.

The provision of data operands and instructions to the computational array is performed with predetermined timing. At 860, the computational elements of the computational array process data operands received via the data lines from the first direction, based on instructions received via the instruction lines from the second direction at a predetermined timing relationship (e.g., receiving during a same cycle, or having a predetermined timing offset).

It is understood that while the above describes certain structures and methods for managing the flow of data and instructions in the processor, different configurations for providing data and instructions may be used in other embodiments. For example, the specific mechanisms for providing data operands and instructions to computational elements may be different and may be configured independently from each other. However, so long as the timing of how the data operands and instructions are provided is known by the compiler, the compiler may be able to construct a program to maintain the relative timings at which the computational elements receive data operands and instructions, maintaining the deterministic and repeatable nature of the program.

Computational Element Operations

Figure 9:
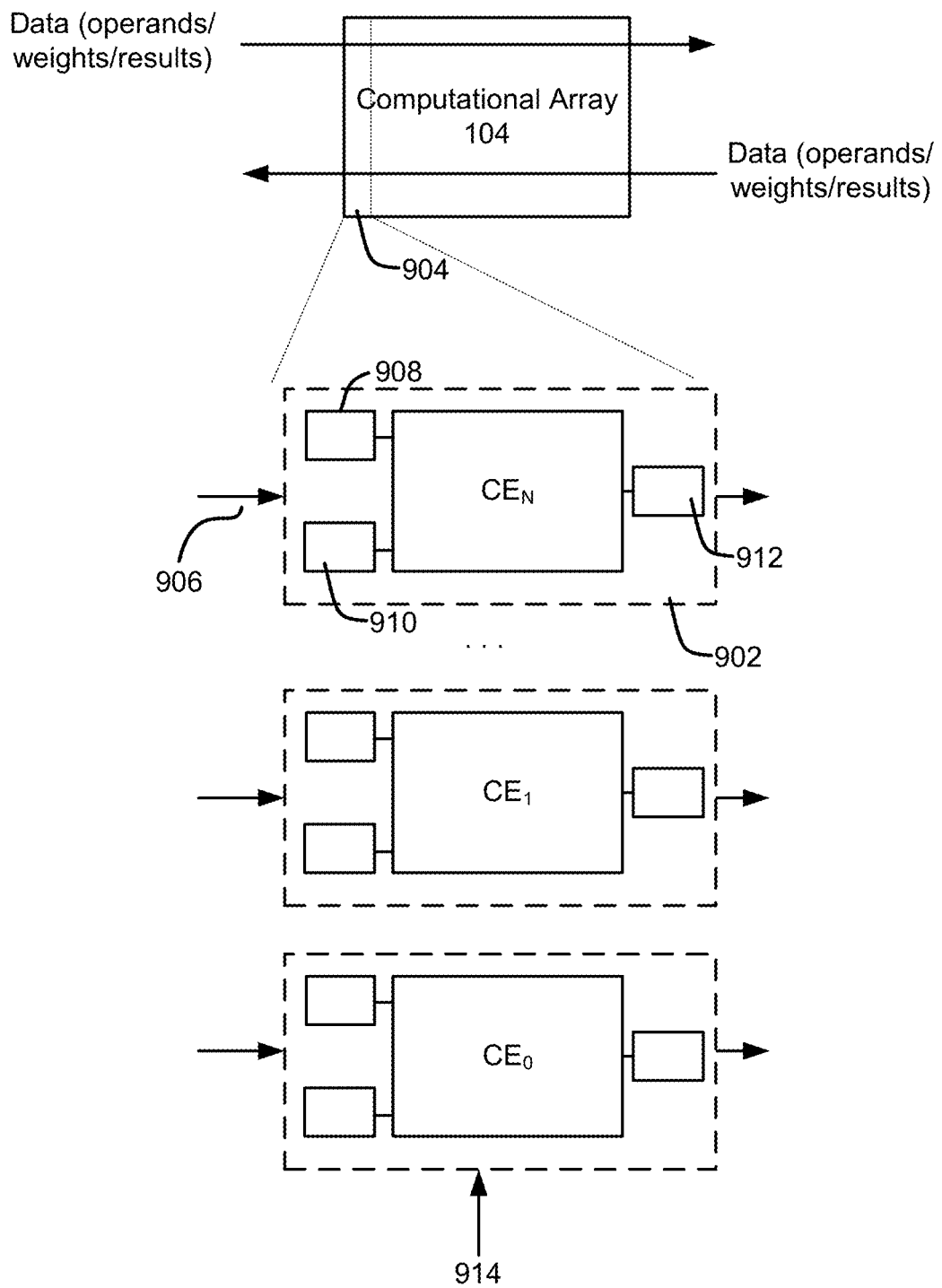
FIG. 9 illustrates a diagram of the computational elements (CEs) that make up the computational array, in accordance with some embodiments.

FIG. 9 illustrates a diagram of the computational elements (CEs) that make up the computational array, in accordance with some embodiments. As discussed above, the CEs of the computational array (e.g., computational array 104) may correspond to arithmetic-logic units (ALUs), multiplier-accumulators (MAC), or a memory array, etc. Each of the CEs receives data (e.g., data operands, weight values, result values) and processes the received data in accordance with received instructions (e.g., via the instruction dispatch circuit 108). As the CEs are configured to automatically consume/process data operands received via the data stream in accordance with received instructions, the CEs do not make any calls to memory to fetch data, increasing efficiency.

As illustrated in FIG. 9, the data streams flow through the computational array 104 bi-directionally. This bidirectional arrangement allows for each CE to receive data from either direction, and to output data back onto the data stream in either direction, allowing for data to be streamed between different CEs within the processor along a single dimension. In some embodiments, the data is streamed along data lanes corresponding to each row of the computational array. Because the data is streamed through the computational array along parallel data lanes, wire congestion on the processor 100 that may result from needing to implement data lanes that "turn corners" to reach certain CEs is reduced, increasing wiring efficiency. In some embodiments, the processor may further comprise lane-switching circuitry (not shown) to allow for data to flow between different rows of the computational array.

As shown in FIG. 9, the CEs 902 of the computational array are arranged as one or more columns 904 of CEs (comprising $CE_0$ through $CE_N$). Each CE 902 of the column is configured to receive data from and output data to a respective data lane 906. In some embodiments, each CE comprises one or more registers 908 and 910 onto which data received via the data lane may be loaded, and one or more result registers 912 for storing result values generated by the CE prior to loading onto the data stream. For example, in embodiments where the CE 902 corresponds to a MACC cell, the registers 908 and 910 correspond to a weights register for storing a received weight value, and an operand register to store a received operand value to be processed in conjunction with the weight value, respectively.

The CEs of the column 904 are configured to process received data (e.g., loaded onto the registers 908 and 910 via respective data lanes) based upon received instructions 914. As discussed above, in some embodiments the instruction 914 may be provided to a plurality of CEs of the column 904 during a single cycle, while in other embodiments, the instruction 914 may be provided to a first CE of the column (e.g., $CE_0$) during a first cycle, which propagates the instruction to a next CE of the column during a subsequent cycle (such that each CE of the column receives the instruction in a staggered fashion). Although FIG. 9 illustrates the CEs 902 receiving data and outputting results along a particular direction, it is understood that the CEs 902 may receive data and/or output results along both directions, based upon the instructions received by the CE.

Figure 10:
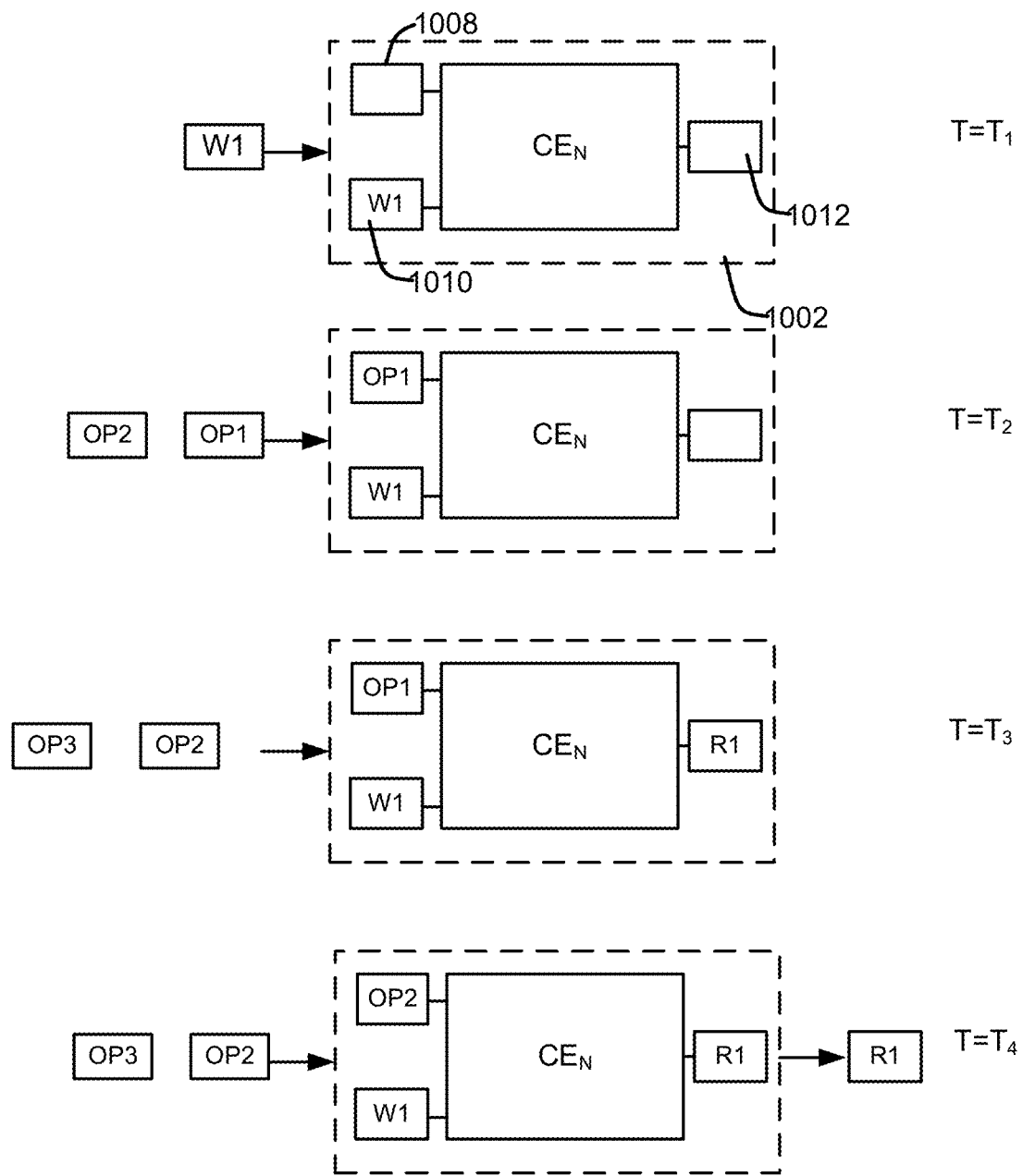
FIG. 10 illustrates how a CE of the computational array may be configured to process data, in accordance with some embodiments.

FIG. 10 illustrates how a CE of the computational array 104 may be configured to process data, in accordance with some embodiments. FIG. 10 illustrates operations of a CE 1002 at a plurality of different times. The CE 1002 illustrated in FIG. 10 may correspond to the CE 902 illustrated in FIG. 9. The CE 1002 may correspond to an ALU or MAC configured to load a weight value, and to process one or more received operands using the weight value to produce result values. As discussed above, the CE 1002 is coupled to a data lane (e.g., corresponding to a row of the computational array on which the CE 1002 is located) from which the CE 1002 may receive data and output data onto. At a time T1, the CE 1002 loads a weight value W1 transmitted along the data lane in accordance with a received weight load instruction. In some embodiments, the weight load instruction instructs the CE 1002 to load data transmitted along the data lane at a particular time (e.g., during a same cycle, after a predetermined number of cycles, etc.) as a weight value, but does not indicate or identify the actual value W1. In addition, as discussed above, data received via the data lane, such as the weight value W1, does not have any accompanying metadata indicating what the data is or what the data is to be used for. Instead, the CE 1002 handles the received data in accordance with the received instruction, and loads the weight value W1 onto a register 1010.

At time T2, the CE 1002 loads an operand value OP1 transmitted along the data lane in accordance with a received operand load instruction. Similar to the weight load instruction discussed above, the operand load instruction instructs the CE 1002 to load data transmitted along the data lane at a particular time as an operand value, but does not indicate or identify the actual value OP1. The CE 1002 loads the operand value OP1 onto a register 1008. As illustrated in FIG. 10, the data lane may transmit a stream of values (e.g., operand values OP1, OP2, OP3, etc.), where the specific value loaded by the CE 1002 is determined based upon the timing at which the values are transmitted along the data lane relative to the receipt of the instruction by the CE 1002.

At time T3, the CE 1002 processes the weight value W1 and operand value OP1 from the registers 1008 and 1010 in accordance with a data processing instruction to generate a result value R1. The generated result value R1 may be stored in a results register 1012. The data processing instruction may comprise a logical instruction, arithmetic instruction, or some combination thereof. In some embodiments, the data processing instruction may simply be a bypass instruction, in which the CE 1002 outputs the same operand value OP1 without processing.

At time T4, the CE 1002 outputs the result value R1 onto the data lane in accordance with a result output instruction. The result value R1 may be transmitted along the data lane to be received by another CE within the processor (e.g., another CE in the same row, or another CE in a different row via lane-switching circuitry). In addition, because the CE 1002 simply receives data transmitted along the data lane without needing to request or fetch the data from memory, the CE 1002 may also load a next operand value OP2 from the data lane in parallel with outputting the result value R1. As such, the CE 1002 is able to load a subsequent operand value as it outputs a result value, allowing for the operand values to be "streamed" through the CEs of the computational array.

While FIG. 10 illustrates the CE performing various operations based on different instructions, in some embodiments, certain operations of the CE may be performed based on a single instruction. For example, in some embodiments, the CE loads an operand (e.g., OP1), processes the operand, and outputs a result value (e.g., R1) responsive to a single instruction within a single clock cycle. Because the CE does not need to request or fetch data from memory, the CE can be provided a steady stream of operand data (e.g., one data operand per cycle) via the data lane, which the CE can process or pass through at a same rate.

Instruction Dispatch Circuit

Figure 11:
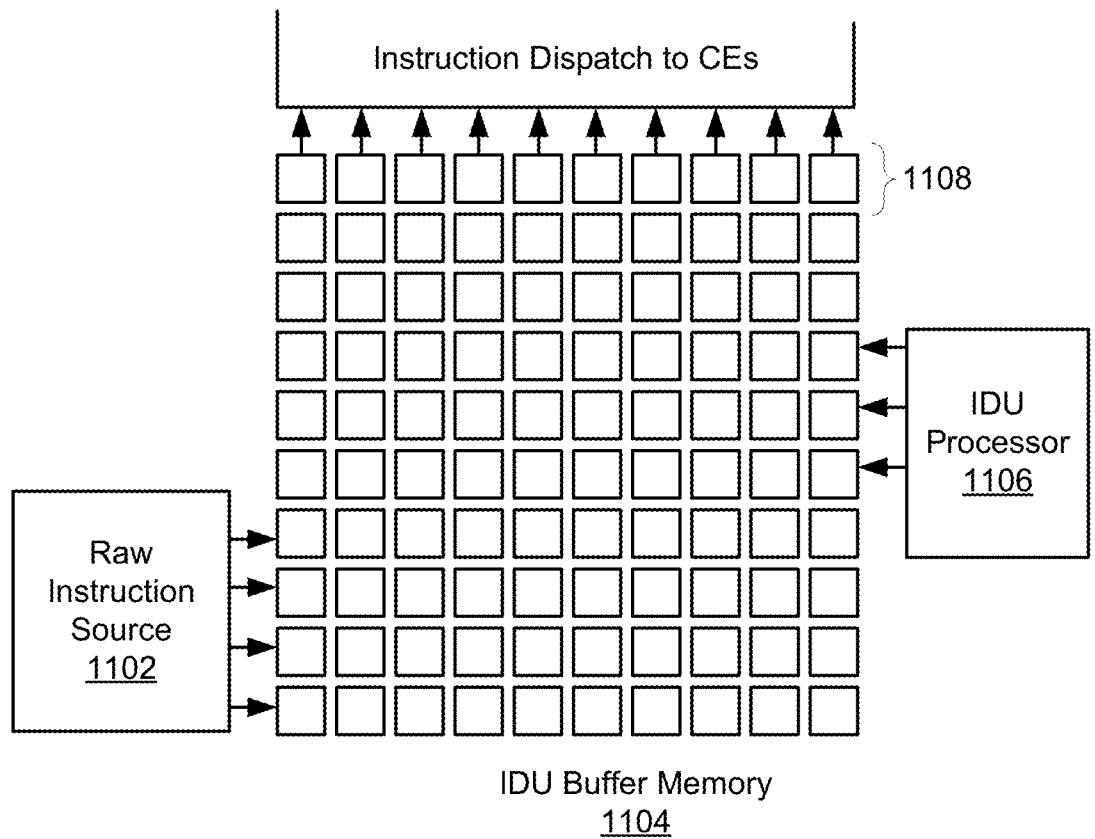
FIG. 11 illustrates a diagram of an instruction dispatch circuit, in accordance with some embodiments.

FIG. 11 illustrates a diagram of an instruction dispatch circuit, in accordance with some embodiments. In some embodiments, the instruction dispatch circuit comprises a raw instruction source 1102, an instruction buffer memory 1104, and an instruction dispatch unit (IDU) 1106. In some embodiments, instructions to be dispatched to the CEs of the computational array are initially stored in a memory (e.g., the memory 102). In some embodiments, in order to reduce storage requirements of the instructions, the instructions may be compressed and packed. For example, in some embodiments, each instruction may comprise a number of bits that is smaller than the number of bits per memory word. In order to increase storage efficiency, the instructions stored within the memory 102 may be packed to include multiple instructions and/or portions of instructions per memory word. In addition, in some embodiments, instructions data may be compressed to reduce a storage requirement of the instructions. For example, in some cases an instruction may be repeated over multiple cycles, and/or may be configured to be dispatched to the CEs of multiple columns. As such, the instruction may be compressed such that a single copy of the instruction is stored, along with metadata instructions indicating how the instruction was compressed. The encrypted, compressed, and packed instructions stored in the memory may be referred to as "raw" instructions. In some embodiments, a raw instruction may include one or more associated meta instructions usable by the instruction dispatch circuit to process the raw instruction. In other embodiments, raw instructions and meta instructions are stored as separate instructions.

The raw instruction source 1102 illustrated in FIG. 11 may correspond to portions of the memory 102 in which the raw instruction data is stored. In addition, in some embodiments, the raw instruction source 1102 may include at least a portion of the control circuit 106 controlling the provision of raw instruction data from the memory to the instruction buffer memory 1104.

The instruction buffer memory 1104 comprises a memory configured to store instructions received from the raw instruction source 1102 for processing and queuing prior to dispatch to the CEs of the computational array, and may include the instruction queues illustrated in FIGS. 3-7 and the additional instructions 206. In some embodiments, each cycle, the instruction buffer memory 1104 outputs a set of X instructions to the CEs of the computational array 104, and receives a set of Y instructions from the raw instruction source 1102, where X and Y are not equal. In some embodiments, the set of X instructions output to the CEs corresponds to one instruction for each column of the computational array, e.g., one instruction from each instruction queue. In other embodiments, the set of X instructions comprises one or more instructions dispatched to more than one column per cycle. In some embodiments, the columns of the computational array are divided into multiple threads, where each thread of each column may receive a different instruction per cycle, allowing for MIMD operation.

In some embodiments, the instruction buffer memory 1104 dispatches instructions to columns of the computational array 104 via a plurality of memory output locations 1108. The memory output locations may correspond to portions of the instruction buffer memory 1104 adjacent to the CEs of the computational array 104. In some embodiments, the memory output locations 1108 correspond to the heads of the instruction queues within the instruction buffer memory 1104, from which the instruction is dispatched to the computational array 104 when they reach the head of the queue. The instruction buffer memory 1104 may correspond to embedded memory, SRAM, DRAM, shift registers, D-type FlipFlops, Latches, non-volatile memory, Flash, ROM, CAM, TCAM, or some combination thereof.

The instruction dispatch unit (IDU) processor 1106 of FIG. 11 comprises a processor (e.g., a microprocessor) configured to process instructions received by the instruction buffer memory 1104 from the raw instruction source 1102 to generate instructions for dispatch to the CEs of the computational array. In some embodiments, the IDU processor 1106 comprises a set of mapping relationships that map the set of Y instructions received from the raw instruction source 1102 during a first cycle, to a set of X instructions to be output to the CEs of the computational array during a later cycle. In some embodiments, the IDU processor 1106 receives instructions from a plurality of first locations in the instruction buffer memory 1104 (e.g., of the set of Y instructions received from the raw instruction source 1102), processes the instructions to generate the set of instructions for dispatching to the CEs (e.g., set of X instructions), and loads the generated instructions to a plurality of second locations in the instruction buffer memory 1104 in preparation for dispatch to the CEs (e.g., into instruction queues corresponding to respective columns of the computational array 104). The IDU processor 1106 may be implemented as an embedded microprocessor, microcontroller, bitslice, Finite State Machine (FSM), Mealy machine, Moore machine, or other type of programmable processor circuit.

In some embodiments, each mapping relationship defines a location in the instruction buffer circuit corresponding to an instruction of the set of Y instructions during a cycle t, and defines how the instruction is to be mapped to another location in the instruction buffer as an instruction of the set of X instructions for a next cycle t+1. In some embodiments, a different set of mapping relationships may be established for each compute cycle or sequence of compute cycles (e.g., after a prior sequence of compute cycles has completed, but prior to the commencement of a next sequence of compute cycles). For example, in some embodiments, the IDU 1106 establishes a different set of mappings after each sequence of n cycles (where n>1).

In some embodiments, the instruction dispatch circuit loads raw instructions from the raw instruction source 1102 to a first section of the instruction buffer memory 1104. The raw instructions are shifted to a second section of the instruction buffer memory 1104 accessed by the IDU processor 1106. The IDU processor 1106 receives the raw instructions from the second section, processes the raw instructions to generate processed instructions, and outputs the processed instructions to the instruction buffer memory (e.g., a third section of the instruction buffer memory corresponding to instruction queues for the columns of the computational array).

Although FIG. 11 illustrates that the raw instruction source 1102 and IDU processor 1106 as connected to particular portions of the instruction buffer memory 1104, it is understood that in some embodiments, the IDU processor 1106 may be configured to retrieve an instruction from any position in the instruction buffer memory 1104, and may map a processed instruction to any position in the instruction buffer memory 1104.

In some embodiments, the IDU processor 1106 processes a received instruction by unpacking, decompressing, and/or decrypting the instruction. For example, as discussed above, the raw instructions may be packed such that each memory word may include more than one instruction and/or a portion of an instruction. The IDU processor 1106 unpacks the instructions and maps the unpacked instructions to distinct locations in the instruction buffer memory 1104.

In some embodiments, the IDU processor 1106 unrolls a received instruction to generate one or more instructions for dispatch. For example, the IDU processor 1106 may perform temporal and/or spatial expansion on a received instruction to generate multiple instructions, by replicating the instruction to be dispatched over multiple time cycles (temporal expansion), and/or replicating the instruction to be dispatched to multiple sets of CEs (e.g., multiple columns) (spatial expansion). In some embodiments, the IDU processor 1106 modifies an address, register, or data argument for replicated instances of the instruction. For example, in some embodiments, an instruction may indicate a register address of a CE on which to load data received via a data lane (such as a received operand value OP1 loaded onto an operand register of the CE as shown in FIG. 11). When the instruction is replicated, the register address may be modified for each replicated instance of the instruction.

In some embodiments, the IDU processor replicates and modifies an instruction by looping, wherein in each loop, the IDU processor replicates the instruction and modifies an argument of the instruction a set amount (e.g., an offset value) from the argument of a previous instruction of the loop. In some embodiments, an instruction may be replicated to generate an array of instructions to be dispatched to an array of compute elements, by performing a nested loop that modifies the replicated instructions in two dimensions.

In some embodiments, the IDU processor 1106 unrolls an instruction based on a received meta instruction. For example, the raw instruction source 1102 loads onto the instruction buffer memory 1104 a first instruction and a meta instruction, where the meta instruction indicates to the IDU 1106 how the first instruction is to be unrolled, and is not mapped by the IDU processor 1106 to an instruction to be dispatched. For instructions where the IDU processor performs looping to replicate an instruction, the instruction may be associated with a meta instruction that indicates one or more parameters such as a number of loop iterations, boundary values, one or more offset values, etc.

In some embodiments, during each cycle, the instruction buffer memory 1104 outputs instructions to the columns of the computational array (e.g., via one or more instruction queues), where each CE of a column receives the same instruction. As such, the computational array may operate in a SIMD mode. In other embodiments, the instruction buffer memory 1104 outputs instructions to a first CE of each column of the computational array (e.g., a bottommost CE), whereupon the instruction is propagated to the remaining CEs of the column over subsequent cycles (e.g., to an adjacent CE each cycle, such that a second CE of the column receives the instruction during a second cycle, a third CE receives the instruction during a third cycle, etc.). This may be referred to as "staggered" SIMD.

In sum, in some embodiments, the instruction buffer memory may function as a queue having I instruction instances. Each cycle (e.g., each compute cycle), the instruction buffer memory outputs a set of X instruction instances to the computational array (e.g., one instruction for each column of the array), and receives a set of Y instruction instances from the raw instruction store. The received instructions are processed by the IDU processor, which unpacks, decompresses, decrypts, and/or unrolls the received instructions to generate processed instructions that are put back into the instruction buffer memory for dispatch to the computational array. As such, the number of instruction instances Y received by the instruction buffer memory during each cycle may be different from the number of instruction instances X dispatched to the computational array. For example, the processed instructions generated by the IDU processor may comprise duplicated instructions, and/or replicated instructions having different arguments. Further, the Y instructions received from the raw instruction store may include meta instructions that are consumed by the IDU processor itself when generating the processed instructions. In some embodiments, the IDU processor receives the Y instructions as input values, and maps the received Y instructions to memory locations in the instruction buffer memory to output the processed instructions, and may fill in a greater number of memory locations than the number of input values received by the IDU processor.

In some embodiments, the instruction buffer memory may comprise a plurality of queues (e.g., an instruction queue corresponding to each column of the computational array, as illustrated in FIGS. 2-6), in which the instructions within each queue (e.g., an instruction vector) are shifted to a subsequent queue over successive cycles (e.g., such that the instructions of the instruction vector are used to process the same set of data as it travels across the computational array). In other embodiments, the instruction buffer memory is configured such that instructions output by the IDU processor are stored in queues (e.g., corresponding to portions of the columns of the instruction buffer memory 1104 illustrated in FIG. 11) to be dispatched to CEs of respective columns without shifting to other queues (e.g., such that the instructions of the instruction vector are used by the same set of CEs of the computational array to process received data).

Figure 12:
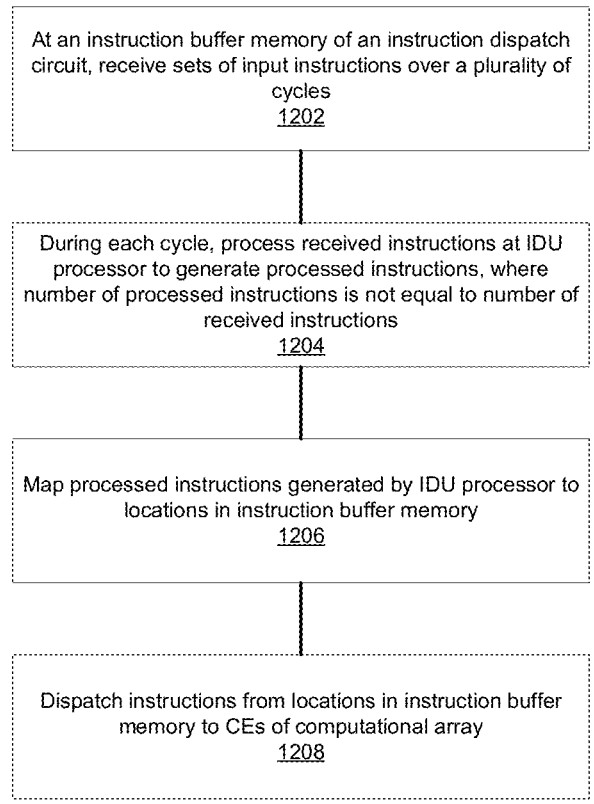
FIG. 12 is a flowchart of a process for processing instructions for dispatch to computational elements of a computational array, in accordance with some embodiments.

FIG. 12 is a flowchart of a process for processing instructions for dispatch to computational elements of a computational array, in accordance with some embodiments. The process of FIG. 12 may be performed by an instruction dispatch circuit (such as the instruction dispatch circuit 108). The instruction dispatch circuit comprises an instruction buffer memory, which receives 1202, over a plurality of computational cycles, a set of input instructions each cycle. In some embodiments, the set of input instructions comprise raw instructions received from a raw instruction source. The raw instructions may comprise instructions that are packed, compressed, and/or encrypted, and may further include meta instructions for processing other instructions of the received instructions.

The instruction dispatch circuit further processes 1204, during each cycle at an instruction dispatch unit (IDU) processor, instructions received by the instruction buffer memory (e.g., from the raw instruction source) and generates processed instructions, where the number of generated processed instructions is not equal to the number of received instructions. In some embodiments, the IDU processor performs unpacking, decompression, and/or decryption on the received instructions, which may change the number of processed instructions generated from the received instructions. In addition, the IDU processor may unroll a received instruction to generate multiple instructions to be dispatched to the CEs of the computational array, e.g., replicated instructions over multiple cycles (temporal expansion) and/or over multiple CEs (spatial expansion). In some embodiments, the IDU processor replicates an instruction by executing one or more loops, each loop producing a replicated instruction with at least one offset relative to a previous instruction. In some embodiments, the IDU processor consumes meta instructions in order to determine one or more looping parameters, e.g., loop boundary conditions, offset amounts, etc.

The instruction dispatch circuit further, at the IDU processor, maps 1206 the generated processed instructions to locations in the instruction buffer memory. In some embodiments, the IDU processor maps the generated instruction to locations in the instruction buffer memory corresponding to instruction queues corresponding to columns of the computational array. In some embodiments, the IDU processor utilizes a particular set of mappings over multiple cycles within a sequence of cycles, and utilizes different sets of mappings over different sequences of cycles.

The instruction dispatch circuit dispatches 1208 instructions from locations in the instruction buffer memory to CEs of the computational array. In some embodiments, the instruction dispatch circuit dispatches an instruction to each column of the computational array, such that the same instruction is applied at all CEs of a particular column. In other embodiments, the instruction dispatch circuit dispatches an instruction to a first CE of a column of the computational array, which propagates the instruction along the column over subsequent cycles. In some embodiments, the instruction buffer memory of the instruction dispatch circuit comprises a plurality of instruction queues corresponding to the columns of the computational array, where the processed instructions generated by the IDU processor are enqueued into an instruction queue corresponding to a particular column for dispatch to the CEs of the column (e.g., as part of an instruction vector). In other embodiments, generated processed instructions are shifted between different instruction queues over one or more cycles, prior to reaching a head of a queue and being dispatched to the CEs of the computational array (e.g., as described in relation to FIGS. 2-6).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A processor, comprising:
   one or more computational arrays each comprising an array of computational elements arranged in a plurality of columns, each computational element adapted to perform a function on received data;
   an instruction dispatch circuit configured to provide instructions to the computational elements of the one or more computational arrays, comprising:
      an instruction buffer memory configured to receive input instructions, the instruction buffer memory further comprising a plurality of memory output locations connected to respective columns of the one or more computational arrays; and
      an instruction dispatch unit (IDU) configured to process the input instructions received by the instruction buffer memory to generate a plurality of instructions and output each of the plurality of instructions to respective memory output locations of the instruction memory buffer, based upon which column of computational elements of the one or more computational arrays each instruction is to be received at,
   wherein computational elements of the one or more computational arrays execute instructions of the plurality of instructions from the plurality of memory output locations on the received data, based upon a timing at which the instructions reaches each computational element.

2. The processor of claim 1, wherein the IDU is further configured to, over a plurality of compute cycles, map the plurality of instructions to locations in the instruction buffer memory different from locations of the received input instruction.

3. The processor of claim 1, wherein the instruction buffer memory comprises a respective instruction queue for each column of computational elements in the one or more computational arrays.

4. The processor of claim 1, wherein the plurality of instructions comprises a plurality of duplicated instructions generated from an instruction of the input instructions, and wherein the IDU is configured to generate the duplicated instructions such that each instruction of the duplicated instructions is configured to be dispatched to one of the one or more computational arrays during a different compute cycle, based upon a temporal offset value included in at least one of the input instructions.

5. The processor of claim 1, wherein the plurality of instructions comprises a plurality of duplicated instructions generated from an instruction of the input instructions, and wherein the IDU is configured to generate the duplicated instructions such that each duplicated instruction is configured to be dispatched to a different computational element of the one or more computational arrays.

6. The processor of claim 1, wherein the plurality of instructions comprises a plurality of duplicated instructions, and wherein each duplicated instruction contains a value for a parameter having a value offset from a value of the parameter of a previous instruction, a value of the offset specified by at least one of the input instructions.

7. The processor of claim 1, wherein the input instructions comprise at least one meta instruction, and wherein the IDU generates the plurality of instructions based upon one or more properties of the at least one meta instruction.

8. The processor of claim 1, wherein the plurality of memory output locations of the instruction buffer memory are configured to dispatch an instruction to a first computational element of a column of the one or more computational arrays.

9. The processor of claim 1, wherein the plurality of memory output locations of the instruction buffer memory are configured to dispatch an instruction of the plurality of instructions to a first computational element of a column of the one or more computational arrays to be propagated to remaining computational elements of the column, such that each computational element of the column receives the instruction during a different cycle, and performs the instruction on data received at the computation element at a predetermined timing relative to the received instruction.

10. The processor of claim 1, wherein the IDU generates the plurality of instructions by performing one or more of unpacking, decompression, and decryption on the input instructions.

11. The processor of claim 1, wherein the IDU is a finite state machine (FSM).

12. The processor of claim 3, wherein each memory output location comprises an instruction queue corresponding to a respective column of computational elements.

13. A method, comprising:
   receiving input instructions at an instruction buffer memory of an instruction dispatch circuit, the instruction dispatch circuit being configured to provide instructions to one or more computational arrays each comprising an array of computational elements arranged in a plurality of columns, each computational element adapted to perform a function on received data, and wherein the instruction buffer memory comprises a plurality of memory output locations connected to respective columns of the one or more computational arrays;
   processing the input instructions received by the instruction buffer memory to generate a plurality of instructions for the one or more computational arrays; and
   outputting each of the plurality of instructions to respective memory output locations of the plurality of memory output locations of the instruction memory buffer,
   wherein computational elements of the one or more computational arrays execute instructions from the plurality of memory output locations on the received data, based upon a timing at which the instructions reach each computational element.

14. The method of claim 13, wherein the instruction buffer memory comprises a respective instruction queue for each column of computational elements in the one or more computational arrays.

15. The method of claim 13, processing the input instructions received by the instruction buffer memory is performed by a Finite State Machine.

16. The method of claim 13, wherein the plurality of instructions comprises a plurality of duplicated instructions generated from an instruction of the input instructions, and wherein processing the input instructions comprises generating the duplicated instructions such that each instruction of the duplicated instructions is configured to be dispatched to one of the one or more computational arrays during a different compute cycle, based upon a temporal offset value included in at least one of the input instructions.

17. The method of claim 13, wherein the plurality of instructions comprises a plurality of duplicated instructions generated from an instruction of the input instructions, and wherein processing the input instructions comprises generating the duplicated instructions such that each duplicated instruction is configured to be dispatched to a different computational element of the one or more computational arrays.

18. The method of claim 13, wherein the plurality of instructions comprises a plurality of duplicated instructions, and wherein each duplicated instruction contains a value for a parameter having a value offset from a value of the parameter of a previous instruction, a value of the offset specified by at least one of the input instructions.

19. The method of claim 13, wherein the input instructions comprise at least one meta instruction, and wherein processing the input instructions comprises generating the plurality of instructions based upon one or more properties of the at least one meta instruction.

20. The method of claim 13, wherein processing the input instructions comprises generating the plurality of instructions by performing one or more of unpacking , decompression, and decryption on the input instructions.

* * * * *